(12) United States Patent
Isobe et al.

(10) Patent No.: US 11,970,396 B2
(45) Date of Patent: Apr. 30, 2024

(54) NEGATIVE THERMAL EXPANSION MATERIAL, COMPOSITE MATERIAL, AND METHOD FOR PRODUCING NEGATIVE THERMAL EXPANSION MATERIAL

(71) Applicants: TOKYO INSTITUTE OF TECHNOLOGY, Tokyo (JP); MITSUI MINING & SMELTING CO., LTD., Tokyo (JP)

(72) Inventors: Toshihiro Isobe, Tokyo (JP); Yuko Hayakawa, Tokyo (JP); Yuri Adachi, Tokyo (JP); Ryosuke Uehara, Tokyo (JP)

(73) Assignees: TOKYO INSTITUTE OF TECHNOLOGY, Tokyo (JP); MITSUI MINING & SMELTING CO., LTD., Tokyo (JP)

( * ) Notice: Subject to any disclaimer, the term of this patent is extended or adjusted under 35 U.S.C. 154(b) by 440 days.

(21) Appl. No.: 16/976,041

(22) PCT Filed: Feb. 26, 2019

(86) PCT No.: PCT/JP2019/007225
§ 371 (c)(1),
(2) Date: Aug. 26, 2020

(87) PCT Pub. No.: WO2019/167924
PCT Pub. Date: Sep. 6, 2019

(65) Prior Publication Data
US 2021/0363012 A1    Nov. 25, 2021

(30) Foreign Application Priority Data
Feb. 27, 2018 (JP) .................. 2018-032930

(51) Int. Cl.
*C01B 25/45* (2006.01)

(52) U.S. Cl.
CPC .......... *C01B 25/45* (2013.01); *C01P 2006/32* (2013.01)

(58) Field of Classification Search
CPC ............................. C01B 25/45; C01P 2006/32
See application file for complete search history.

(56) References Cited

FOREIGN PATENT DOCUMENTS

| CN | 102432292 A | 5/2012 |
|---|---|---|
| CN | 104843663 A | 8/2015 |

(Continued)

OTHER PUBLICATIONS

Alamo, Jaime and Roy, Rustum. Abstract of "Zirconium phosphosulfates with NaZr2(PO4)3-type structure," Feb. 1984. Journal of Solid State Chemistry. vol. 51, Issue 2. (Year: 1984).*

(Continued)

*Primary Examiner* — Coris Fung
*Assistant Examiner* — Catriona M Corallo
(74) *Attorney, Agent, or Firm* — McCoy Russell LLP

(57) ABSTRACT

A negative thermal expansion material having a negative thermal expansion coefficient according to the present invention is represented by $Zr_{2-a}M_aS_xP_2O_{12+\delta}$, where M is at least one selected from Ti, Ce, Sn, Mn, Hf, Ir, Pb, Pd, and Cr; a is 0≤a<2; x is 0.4≤x≤1; and δ is a value defined as to satisfy a charge neutral condition. The present invention makes it possible to provide a negative thermal expansion material, a composite material and a method for producing a negative thermal expansion material that can realize reduction in cost and density reduction.

12 Claims, 33 Drawing Sheets

(56) References Cited

FOREIGN PATENT DOCUMENTS

JP          S62138214 A     6/1987
JP          2017048071 A    3/2017

OTHER PUBLICATIONS

Thoma et al. "Mixed Metal Phospho-Sulfates for Acid Catalysis". Sandia National Laboratories and Lawrence Livermore National Laboratory, 1997. (Year: 1997).*
ISA Japan Patent Office, International Search Report Issued in Application No. PCT/JP2019/007225, dated Apr. 23, 2019, WIPO, 4 pages.
Ruschman, C., "Chemical tuning of thermal expansion in oxides," Master's in Chemistry and Biochemistry Thesis, Georgia Institute of Technology, School of Chemistry and Biochemistry, May 20, 2010, 32 pages.
China National Intellectual Property Administration, Office Action and Search Report Issued in Application No. 201980026176.5, dated Jun. 1, 2022, 18 pages. (Submitted with Machine Translation).

* cited by examiner

|  | BAKING CONDITION | | ATOMIC RATIO BY ICP-OES | | |
|---|---|---|---|---|---|
|  | BAKING TEMPERATURE [°C] | BAKING TIME [h] | Zr | P | S |
| SAMPLE 1 | - | - | 2 | 1.8 | 1.6 |
| SAMPLE 2 | 400 | 4 | 2 | 1.9 | 1.2 |
| SAMPLE 3 | 450 | 4 | 2 | 2 | 1 |
| SAMPLE 4 | 500 | 4 | 2 | 1.9 | 0.90 |
| SAMPLE 5 | 500 | 12 | 2 | 2 | 0.76 |
| SAMPLE 6 | 600 | 4 | 2 | 2 | 0.54 |
| SAMPLE 7 | 700 | 4 | 2 | 1.9 | 0.48 |
| SAMPLE 8 | 800 | 4 | 2 | 1.9 | 0.44 |
| SAMPLE 9 | 900 | 4 | 2 | 1.9 | 0.43 |

HYDROTHERMAL TREATMENT TEMPERATURE: 180°C
HYDROTHERMAL TREATMENT TIME: 4 DAYS

Fig. 3

SAMPLE 4

SAMPLE 4

HYDROTHERMAL TREATMENT TEMPERATURE: 180°C
HYDROTHERMAL TREATMENT TIME: 2 DAYS

HYDROTHERMAL TREATMENT TEMPERATURE: 230°C
HYDROTHERMAL TREATMENT TIME: 4 DAYS

SAMPLE 11
(HYDROTHERMAL TREATMENT: 110°C)

SAMPLE 19
(HYDROTHERMAL TREATMENT: 180°C)

|       | S   | Zr   | Ti   |
|-------|-----|------|------|
| a =0.1 | 0.9 | 1.30 | 0.08 |
| a =0.2 | 0.9 | 1.51 | 0.18 |
| a =0.3 | 0.9 | 1.54 | 0.28 |
| a =0.4 | 0.9 | 1.36 | 0.38 |
| a =0.5 | 0.9 | 1.40 | 0.46 |
| a =0.6 | 0.9 | 1.32 | 0.58 |
| a =0.7 | 0.9 | 1.22 | 0.70 |

| | ZSP | Ti0.1 | Ti0.2 | Ti0.3 | Ti0.4 | Ti0.5 | Ti0.6 | Ti0.7 |
|---|---|---|---|---|---|---|---|---|
| R.T.-100°C | -9.03 | -6.40 | -6.18 | -5.70 | -6.59 | -1.28 | 0.54 | -2.40 |
| 100-180°C | -32.3 | -27.1 | -33.94 | -20.98 | -37.37 | -1.10 | -9.19 | -5.37 |
| 180-350°C | -2.81 | -4.70 | -4.80 | -3.72 | -4.68 | -2.59 | -2.85 | -2.26 |
| 350-500°C | -4.28 | -7.85 | -3.86 | -3.04 | -4.51 | | | |
| WHOLE | -9.18 | -9.48 | -9.63 | -8.84 | -10.43 | -3.82 | -3.42 | -2.81 |

UNIT: ppm/°C

Fig. 19

|  | Ce0.4 | Mn0.2 | Mn0.4 | Sn0.2 | Sn0.4 | Sn0.6 |
|---|---|---|---|---|---|---|
| R.T.-100°C | -6.12 | -8.47 | -6.58 | -4.05 | -6.33 | -7.65 |
| 100-180°C | -31.9 | -33.04 | -32.86 | -29.28 | -40.65 | -44.2 |
| 180-350°C | -3.96 | -4.63 | -4.80 | -3.04 | -4.19 | -3.64 |
| 350-500°C | -4.05 | -2.86 | -4.18 | -5.37 | -2.79 | -3.08 |
| WHOLE | -9.03 | -9.44 | -9.60 | -8.36 | -10.23 | -10.91 |

UNIT: ppm/°C

Fig. 26

NEGATIVE THERMAL EXPANSION MATERIAL, COMPOSITE MATERIAL, AND METHOD FOR PRODUCING NEGATIVE THERMAL EXPANSION MATERIAL

CROSS-REFERENCE TO RELATED APPLICATIONS

The present application is a U.S. National Phase of International Patent Application Serial No. PCT/JP2019/007225 entitled "NEGATIVE THERMAL EXPANSION MATERIAL, COMPOSITE MATERIAL, AND METHOD FOR PRODUCING NEGATIVE THERMAL EXPANSION MATERIAL," filed on Feb. 26, 2019. International Patent Application Serial No. PCT/JP2019/007225 claims priority to Japanese Patent Application No. 2018-032930 filed on Feb. 27, 2018. The entire contents of each of the above-referenced applications are hereby incorporated by reference for all purposes.

TECHNICAL FIELD

The present invention relates to a negative thermal expansion material, a composite material and a method for producing a negative thermal expansion material.

BACKGROUND AND SUMMARY

In devices such as electronic devices, optical devices, fuel cells and sensors, in which a plurality of materials are used in combination, misalignment due to thermal expansion causes problems. Other than this, serious failures such as interfacial delamination and disconnection occurs by difference in thermal expansion coefficient of materials. Because of this, various near-zero thermal expansion materials and thermal expansion control technologies have been investigated. For example, invar alloy, glass and cordierite are widely known as a single-phase near zero thermal expansion material and used in industrial products and consumer products. Recently, attempts have been made to reduce the thermal expansion of a substance hardly controlled in thermal expansion coefficient by combination use with a filler having a low thermal expansion coefficient. Particularly, combination use with a material having a negative thermal expansion coefficient (hereinafter referred to also as a negative thermal expansion material) attracts attention because the material, even in a low blending ratio, can effectively offset thermal expansion.

Patent Literature 1 discloses, as a material having a negative thermal expansion coefficient, a material represented by $Bi_{1-x}Sb_xNiO_3$ (where x is $0.02 \leq x \leq 0.20$).

CITATION LIST

Patent Literatures

Patent Literature 1: Japanese Unexamined Patent Application Publication No. 2017-48071

Technical Problem

As a material having a negative thermal expansion coefficient, various materials have been reported up to present. However, many of them contain a precious metal and a heavy metal as a main component. For the reason, reduction in cost and density has not yet been realized.

In consideration of the aforementioned problems, an object of the present invention is to provide a method for producing a negative thermal expansion material, a composite material and a method for producing a negative thermal expansion material, that can realize reduction in cost and density.

Solution to Problem

A negative thermal expansion material having a negative thermal expansion coefficient according to the present invention is characterized by being represented by $Zr_{2-a}M_aS_xP_2O_{12+\delta}$ where M is at least one selected from Ti, Ce, Sn, Mn, Hf, Ir, Pb, Pd and Cr; a is $0 \leq a < 2$; x is $0.4 \leq x \leq 1$; and $\delta$ is a value defined so as to satisfy a charge neutral condition.

A composite material according to the present invention is characterized by comprising a negative thermal expansion material as mentioned above and a material having a positive thermal expansion coefficient.

A method for producing a negative thermal expansion material according to the present invention has a step of hydrothermally treating a mixture containing zirconium oxychloride octahydrate, ammonium phosphate and sulfuric acid at a temperature of 130° C. or more, and a step of baking the mixture hydrothermally treated, at a temperature of 450° C. or more to form a material represented by $Zr_2S_xP_2O_{12+\delta}$ (where $0.4 \leq x \leq 1$ and $\delta$ is a value defined so as to satisfy a charge neutral condition) and having a negative thermal expansion coefficient.

A method for producing a negative thermal expansion material according to the present invention has a step of hydrothermally treating a mixture containing zirconium oxychloride octahydrate, ammonium phosphate, sulfuric acid and an additive containing element M at a temperature of 130° C. or more, and a step of baking the mixture hydrothermally treated, at a temperature of 450° C. or more to form a material represented by $Zr_{2-a}M_aS_xP_2O_{12+\delta}$ (where M is at least one selected from Ti, Ce, Sn, Mn, Hf, Ir, Pb, Pd and Cr; a is $0 \leq a < 2$; x is $0.4 \leq x \leq 1$; and $\delta$ is a value defined so as to satisfy a charge neutral condition) and having a negative thermal expansion coefficient.

Advantageous Effects of Invention

The present invention makes it possible to provide a negative thermal expansion material, a composite material and a method for producing a negative thermal expansion material that can realize reduction in cost and density.

BRIEF DESCRIPTION OF THE FIGURES

FIG. 3 shows a table showing baking conditions and atomic ratios of samples.

FIG. 19 is a graph collectively showing thermal expansion coefficients of $Zr_{2-a}Ti_aSP_2O_{12}$ at separate temperature ranges.

FIG. 26 is a graph collectively showing thermal expansion coefficients of samples obtained by substituting part of Zr site with Ce, Mn and Sn, in separate temperature ranges.

DETAILED DESCRIPTION

Now, embodiments of the present invention will be described.

A negative thermal expansion material according to the embodiment is characterized by being represented by $Zr_{2-a}M_aS_xP_2O_{12+\delta}$, where M is at least one selected from Ti, Ce, Sn, Mn, Hf, Ir, Pb, Pd and Cr; a is $0 \leq a < 2$; x is $0.4 \leq x \leq 1$; and $\delta$ is a value defined so as to satisfy a charge neutral condition.

For example, if a=0, the negative thermal expansion material is a material represented by $Zr_2S_xP_2O_{12+\delta}$. In contrast, if a≠0, the negative thermal expansion material is a material obtained by substituting part of Zr site with M.

For example, if M is Ti, the negative thermal expansion material is a material represented by $Zr_{2-a}Ti_aS_xP_2O_{12+\delta}$, where a is preferably $0 < a \leq 0.7$.

If M is Ce, the negative thermal expansion material is a material represented by $Zr_{2-a}Ce_aS_xP_2O_{12+\delta}$, where a is preferably $0 < a \leq 0.4$.

If M is Sn, the negative thermal expansion material is a material represented by $Zr_{2-a}Sn_aS_xP_2O_{12+\delta}$, where a is preferably $0 < a \leq 1$.

If M is Mn, the negative thermal expansion material is a material represented by $Zr_{2-a}Mn_aS_xP_2O_{12+\delta}$, where a is preferably $0 < a \leq 0.2$.

Besides there, element M, which substitutes part of Zr site, may be Hf, Ir, Pb, Pd and Cr.

In the embodiment, part of S site of a negative thermal expansion material represented by $Zr_{2-a}M_aS_xP_2O_{12+\delta}$, may be substituted by Mo or W.

In the embodiment, part of P site may be further substituted by an element such as V, Mn, Cr, As and Nb.

As described above, a negative thermal expansion material according to the embodiment is mainly constituted of cheap and relatively light atoms. Accordingly, reduction in cost and density of a negative thermal expansion material can be realized.

Now, a negative thermal expansion material according to the embodiment will be more specifically described. In the following embodiments, a material represented by $Zr_2S_xP_2O_{12+\delta}$ where $0.4 \leq x \leq 1$; and $\delta$ is a value defined so as to satisfy a charge neutral condition, will be described as an example. In the embodiments, other negative thermal expansion materials represented by $Zr_{2-a}M_aS_xP_2O_{12+\delta}$ have the same characteristics as this.

Figure 1A:
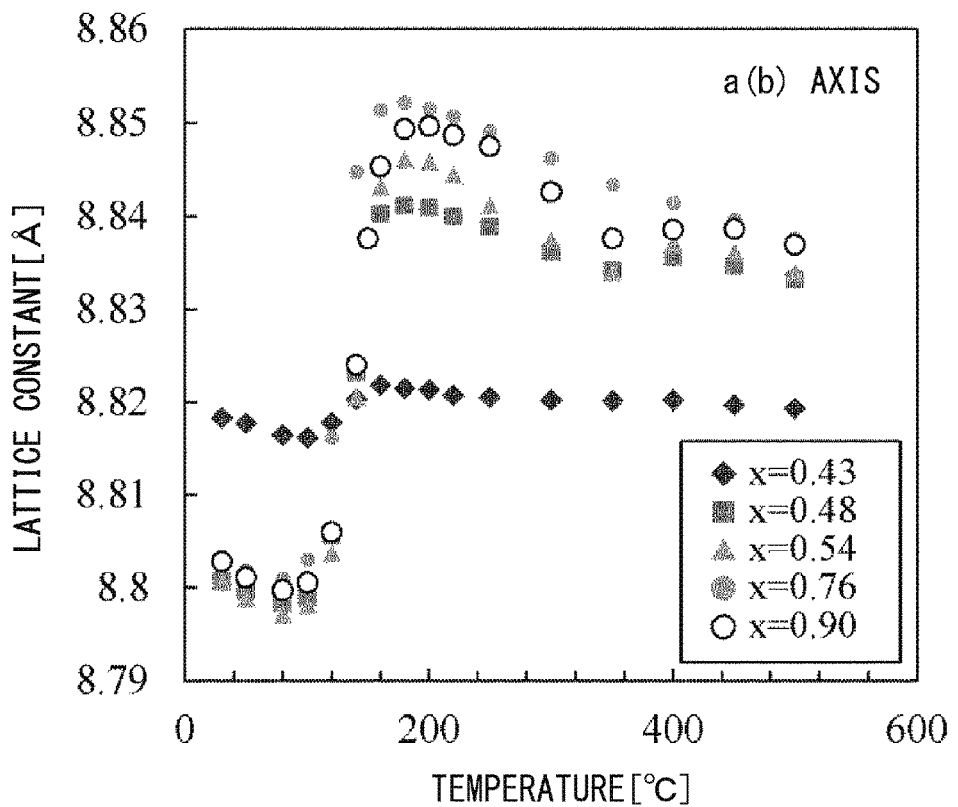
FIG. 1A is a graph showing the temperature characteristics of a negative thermal expansion material according to the present invention.
Figure 1B:
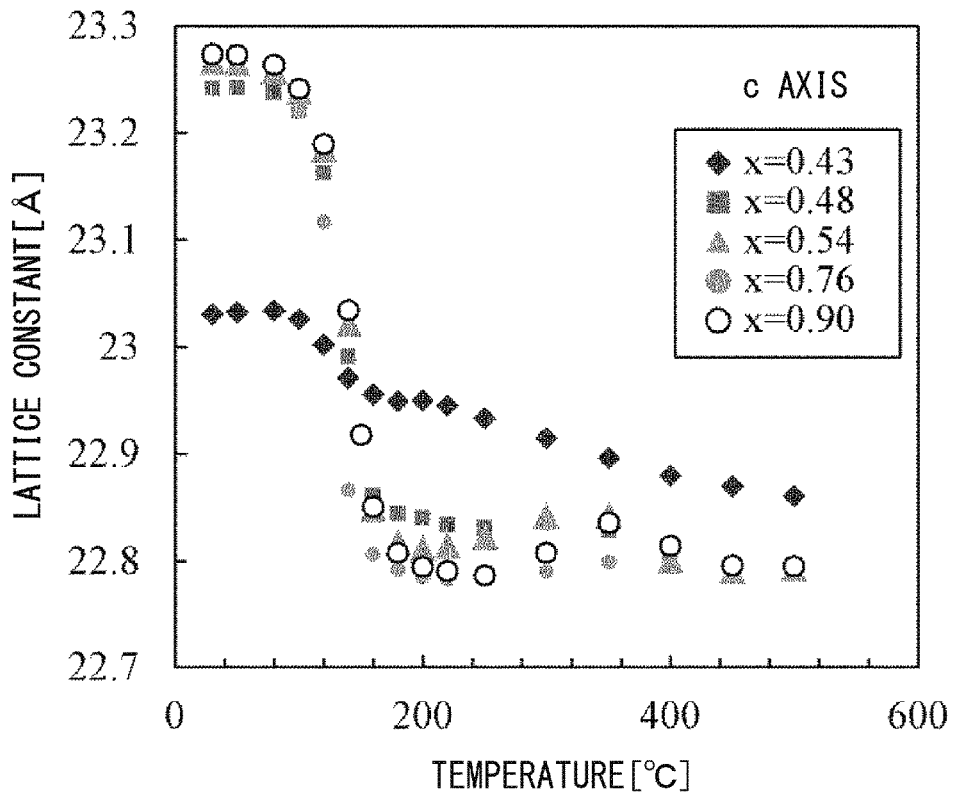
FIG. 1B is a graph showing the temperature characteristics of a negative thermal expansion material according to the present invention.
Figure 1C:
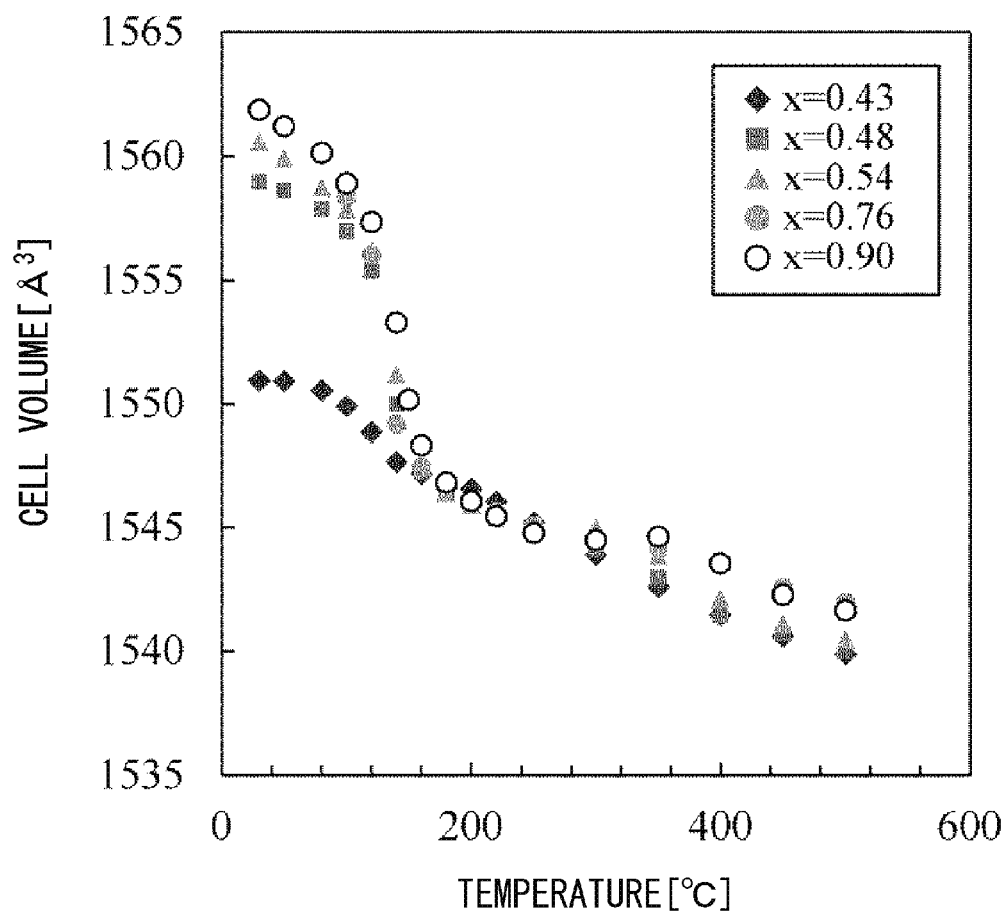
FIG. 1C is a graph showing the temperature characteristics of a negative thermal expansion material according to the present invention.

FIG. 1A to FIG. 1C are graphs showing the temperature characteristics of negative thermal expansion materials represented by $Zr_2S_xP_2O_{12+\delta}$.

FIG. 1A shows the temperature characteristics of lattice constant of a (b) axis; FIG. 1B shows the temperature characteristics of lattice constant of c axis; and FIG. 1C shows the temperature characteristics of a cell volume. Note that, since a negative thermal expansion material according to the embodiment is a rhombohedral system, the lengths of a axis and b axis are equal.

As shown in FIG. 1A to FIG. 1C, the thermal expansion coefficient of a negative thermal expansion material according to the embodiment changes depending on the value of x, i.e., the content of sulfur atom S. For example, if the value of x is 0.48≤x≤0.9, the absolute value of volume expansion coefficient of the negative thermal expansion material at a temperature of 100 to 180° C. is higher than that at a temperature of more than 180° C. In other words, if value x is 0.48≤x≤0.9, the cell volume sharply changes in a temperature range from 100° C. to 180° C. In the temperature range, c axis sharply shrinks while a axis expands, with the result that the volume of the whole lattice sharply shrinks.

As an example, the volume expansion coefficient (100 to 180° C.) of a negative thermal expansion material according to the embodiment is −94 ppm/° C. if x=0.48; −101 ppm/° C. if x=0.54; −101 ppm/° C. if x=0.76; and −108 ppm/° C. if x=0.90. As the value x increases, the volume expansion coefficient (100 to 180° C.) tends to decrease.

Focusing on the case of x=0.90, the volume expansion coefficient in the range of 30 to 100° C. is −26 ppm/° C.; the volume expansion coefficient in the range of 100 to 180° C. is −108 ppm/° C.; the volume expansion coefficient in the range of 180 to 350° C. is −8.1 ppm/° C.; and the volume expansion coefficient in the range of 350 to 500° C. is −13 ppm/° C.

If the value x is 0.4≤x<0.48, the volume expansion coefficient of a negative thermal expansion material becomes almost constant at 80° C. or more (see, FIG. 1C, x=0.43). In other words, if the value x is 0.4≤x<0.48, the degree of the volume shrinkage from 80° C. to 180° C. is low compared to those of other samples. As the result, the volume expansion coefficient becomes almost constant at 80° C. or more. Focusing on the case of x=0.43, the volume expansion coefficient reached an almost constant value of −16 ppm/° C. at 80° C. or more.

As described above, a negative thermal expansion material according to the embodiment has a negative thermal expansion coefficient in the range of room temperature to 500° C. In particular, if value x is 0.48≤x≤0.9, a large negative thermal expansion coefficient is shown in the range of 100 to 180° C. The magnitude of the thermal expansion coefficient decreases as the content of sulfur atom S decreases. In contrast, if value x is 0.4≤x<0.48, the volume expansion coefficient of the negative thermal expansion material becomes almost constant at 80° C. or more.

The crystal phase of a negative thermal expansion material according to the embodiment is represented by α-$Zr_2SP_2O_{12}$ (ICDD card number: 04-017-0937) and may partly contain another crystal phase. For example, other than α phase (α-$Zr_2SP_2O_{12}$), β phase (β-$Zr_2SP_2O_{12}$ (ICDD card: 04-007-8019)) may be partly contained.

The atoms constituting a negative thermal expansion material according to the embodiment ($Zr_2S_xP_2O_{12+\delta}$) are Zr, S and P. Since these materials are cheap, a negative thermal expansion material can be inexpensively formed compared to conventional negative thermal expansion materials formed of precious metals. Accordingly, cost reduction of a negative thermal expansion material can be realized.

The atoms constituting a negative thermal expansion material according to the embodiment ($Zr_2S_xP_2O_{12+\delta}$) are Zr, S and P. Since these atoms (particularly, S and P) are relatively light in weight, the density of the negative thermal expansion material can be reduced compared to conventional negative thermal expansion materials. Accordingly, density reduction of the negative thermal expansion material can be realized.

For example, the density of a negative thermal expansion material, Mn—Sn—Zn—N (Smartec®) is about 7 g/cm³. The density of the negative thermal expansion material represented by $Zr_2WP_2O_{12}$ is 3.86 g/cm³ and the density of $Zr_2MoP_2O_{12}$ is 3.36 g/cm³. In contrast, the density of a negative thermal expansion material according to the embodiment represented by $Zr_2SP_2O_{12}$ is 3.02 g/cm³, which is lower than the densities of conventional negative thermal expansion materials.

A composite material controlled in thermal expansion coefficient is formed by mixing a negative thermal expansion material and a material (positive thermal expansion material) having a positive thermal expansion coefficient, in other words, by dispersing a negative thermal expansion material in a positive thermal expansion material. At this time, if the density of the negative thermal expansion material is reduced, the negative thermal expansion material can be homogeneously dispersed in the positive thermal expansion material.

As described above, a negative thermal expansion material according to the embodiment varies in thermal expansion coefficient depending on the value x, i.e., the content of sulfur atom S. More specifically, if value x is 0.48≤x≤0.9, the material shows a large negative thermal expansion coefficient in the range of 100 to 180° C. The magnitude of the negative thermal expansion coefficient decreases as the content of sulfur atom S decreases. If value x is 0.4≤x<0.48, the volume expansion coefficient of the negative thermal expansion material becomes almost constant at 80° C. or more.

In the embodiment, depending on the characteristics of the positive thermal expansion material to be used for forming a composite material, the characteristics of the composite material to be formed and the temperature range in which the composite material is to be used, it is preferable to determine value x of the negative thermal expansion material.

For example, if the positive thermal expansion material is a resin material, in consideration of the operation temperature (heatproof temperature) of the resin material, the value x of a negative thermal expansion material is preferably set at 0.48≤x≤0.9. In other words, in consideration of the heatproof temperature of the resin material, the operation temperature of the resin material is presumed to be from room temperature to 200° C. Also, if value x is 0.48≤x≤0.9, a large negative thermal expansion coefficient is shown in the range of 100 to 180° C. Accordingly, if value x of a negative thermal expansion material is specified as 0.48≤x≤0.9, the operation temperature range of a resin material can be overlapped with the range where a negative thermal expansion material shows a large negative thermal expansion, with the result that the thermal expansion coefficient of the composite material can be efficiently controlled.

If the positive thermal expansion material is a metal material, in consideration of the operation temperature (heatproof temperature) of the metal material, value x of a negative thermal expansion material is preferably set at 0.4≤x≤0.48. In other words, the composite material containing a metal material is mostly used in a wide range of operation temperature. If value x herein is 0.4≤x<0.48, the volume expansion coefficient of a negative thermal expansion material becomes almost constant at 80° C. or more. Accordingly, if value x of a negative thermal expansion material is set at 0.4≤x<0.48, the operation temperature range of a composite material containing a metal material can be broadly overlapped with the range where the volume expansion coefficient of a negative thermal expansion material becomes almost constant, with the result that the thermal expansion coefficient of the composite material can be efficiently controlled.

Note that, the above constitution is just an example. In the embodiment, if a positive thermal expansion material is a metal material, a composite material may be formed by use of a negative thermal expansion material in which value x is set at 0.48≤x≤0.9. If a positive thermal expansion material is a resin material, a composite material may be formed by use of a negative thermal expansion material in which value x is set at 0.4≤x<0.48. More specifically, in the embodiment, in consideration of, e.g., the temperature range at which a composite material is used and characteristics of a positive thermal expansion material to be mixed, the value x of a negative thermal expansion material can be determined.

Figure 2:
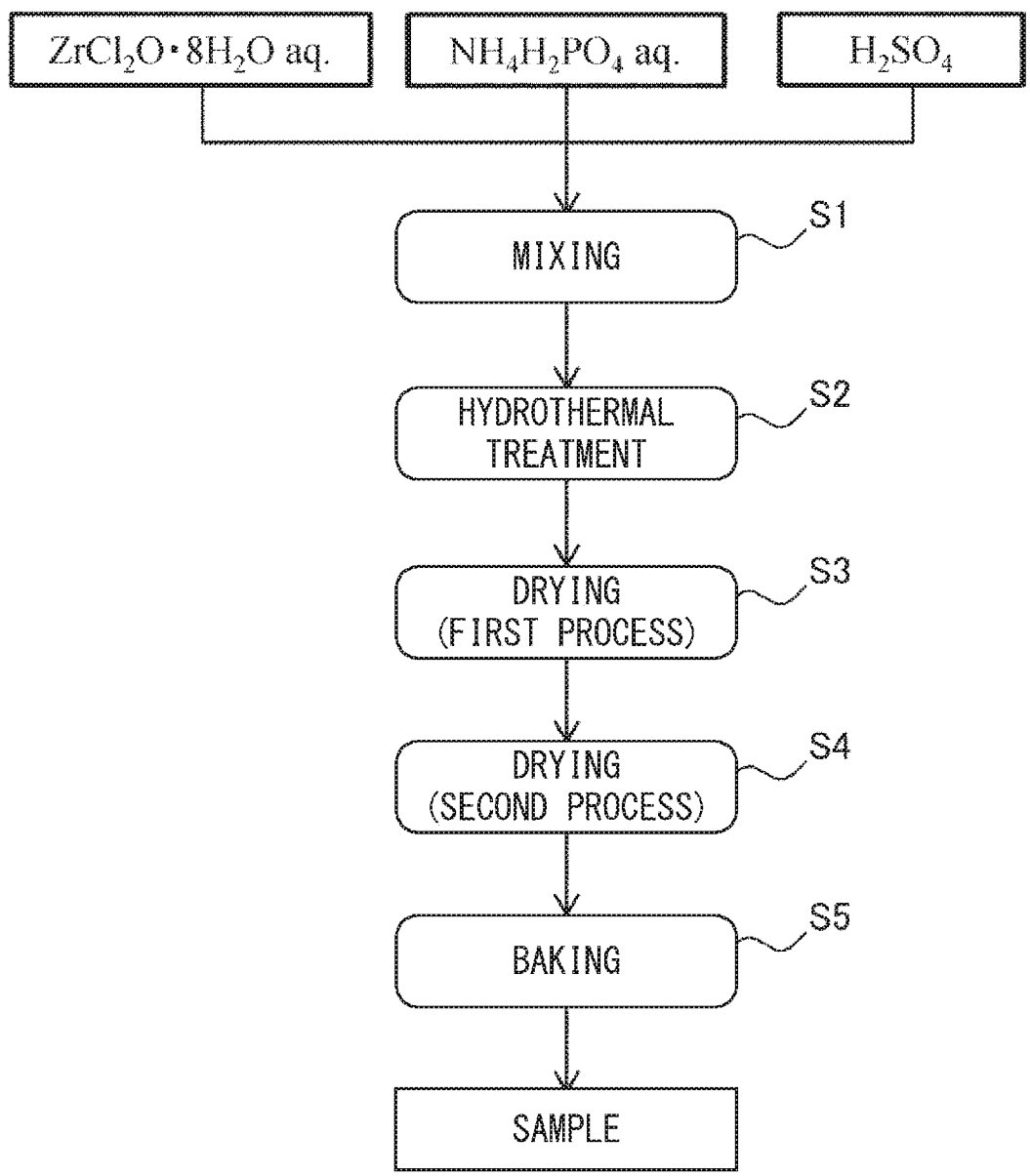
FIG. 2 shows the flowchart of a method for producing a negative thermal expansion material according to the present invention.

Now, a method for producing a negative thermal expansion material ($Zr_2S_xP_2O_{12+\delta}$) according to the embodiment will be described with reference to the flowchart shown in FIG. 2. First, zirconium oxychloride octahydrate ($ZrCl_2O\cdot 8H_2O$), ammonium phosphate and sulfuric acid ($H_2SO_4$) are prepared as raw materials. Ammonium phosphate herein is at least one selected from ammonium dihydrogen phosphate ($NH_4H_2PO_4$) and diammonium hydrogen phosphate ($(NH_4)_2HPO_4$) can be used. After $ZrCl_2O\cdot 8H_2O$ and $NH_4H_2PO_4$ are dissolved in distilled water, sulfuric acid is mixed in the aqueous solution of these and stirred for predetermined time (step S1).

After completion of stirring, the resultant aqueous solution (mixture) is hydrothermally treated at a temperature of 130° C. or more, preferably 180° C. or more (step S2). The time for the hydrothermal treatment is specified as 0.5 to 4 days. After the hydrothermal treatment is carried out for predetermined time, the mixture (hydrothermally treated) is dried (step S3). More specifically, after the hydrothermal treatment, a white precipitate is generated in the container. The solution (mixture) containing the white precipitate is poured in an evaporating dish and heated by a heater of about 100° C. to vaporize extra moisture (first drying process). At this time, since the mixture is not completely dried due to the content of excessive sulfuric acid, the evaporating dish is placed in an electric furnace of 300° C. and then second drying process was carried out (step S4).

After completion of the 2nd drying process, the mixture (dried) is baked at a temperature of 450° C. or more to form a material having a negative thermal expansion coefficient and represented by the above general formula (step S5). The temperature for baking the mixture can be set, for example, at 450° C. or more and 900° C. or less. In the baking process, value x in the above general formula can be controlled by controlling the temperature for baking the dried mixture. More specifically, as the baking temperature increases, sulfur δ is more easily removed and the content ratio of sulfur S in the above formula decreases. At this time, value x (i.e., the content of S) in the above general formula can be controlled by controlling the baking time.

In the embodiment, since a negative thermal expansion material is produced by a hydrothermal method, the negative thermal expansion material can be produced at low cost. Although the details will be described later, the particle size distribution of a negative thermal expansion material can be narrowed since a hydrothermal method is used. Since the particle size distribution of a negative thermal expansion material is narrow as mentioned above, the negative thermal expansion material can be homogeneously dispersed in a positive thermal expansion material.

When a method for producing a negative thermal expansion material according to the embodiment is used, the negative thermal expansion material can be formed into cubic particles of 200 to 300 nm on a side (see, FIG. 7). More specifically, since the particle size of the negative thermal expansion material can be reduced, if the negative thermal expansion material and a positive thermal expansion material are mixed to form a composite material, the degree of surface roughness of the composite material can be decreased.

Note that, the production method mentioned above is for producing a material represented by $Zr_2S_xP_2O_{12+\delta}$ (i.e., a=0). A material represented by $Zr_{2-a}M_aS_xP_2O_{12+\delta}$ (0<a<2) can be produced as follows: in mixing raw materials in step S1, a material (additive) containing element M is added other than zirconium oxychloride octahydrate, ammonium phosphate and sulfuric acid. For example, if M is Ti, a titanium (IV) sulfate solution ($Ti(SO_4)_2$) is added. If M is Ce, cerium sulfate tetrahydrate ($Ce(SO_4)_2\cdot 4H_2O$) is added. If M is Sn, tin oxide ($SnO_2$) is added. If M is Mn, manganese dioxide ($MnO_2$) is added. Note that, these additives are just as examples. Materials (additives) other than these may be used as long as they can add element M to a negative thermal expansion material.

As described above, in the embodiment, part of S site of a negative thermal expansion material represented by $Zr_{2-a}M_aS_xP_2O_{12+\delta}$, may be substituted by Mo or W. In this case, a material (additive) containing an element Mo or an element W is added during production. In this manner, part of S site can be substituted by Mo or W.

EXAMPLES

Now, Examples of the present invention will be described.
In the following, Examples of the following negative thermal expansion materials will be described.
(1) $Zr_2S_xP_2O_{12+\delta}$
(2) $Zr_{2-a}Ti_aS_xP_2O_{12+\delta}$ (part of Zr site is substituted by Ti)
(3) $Zr_{2-a}Ce_aS_xP_2O_{12+\delta}$ (part of Zr site is substituted by Ce)
(4) $Zr_{2-a}Sn_aS_xP_2O_{12+\delta}$ (part of Zr site is substituted by Sn)
(5) $Zr_{2-a}Mn_aS_xP_2O_{12+\delta}$ (part of Zr site is substituted by Mn)
(6) $Zr_2S_{1-b}Mo_bP_2O_{12+\delta}$ (part of S site is substituted by Mo)
(7) $Zr_2S_{1-b}W_bP_2O_{12+\delta}$ (part of S site is substituted by W)
(1) $Zr_2S_xP_2O_{12+\delta}$
Preparation and Evaluation of Negative Thermal Expansion Material First, in order to examine the relationship between a composition of a negative thermal expansion material according to the present invention represented by $Zr_2S_xP_2O_{12+\delta}$ (0.4≤x≤1 and δ is a value defined so as to satisfy a charge neutral condition) and a thermal expansion coefficient thereof, samples 1 to 9 were prepared. Samples 1 to 9 were prepared in accordance with the flowchart shown in FIG. 2.

More specifically, first, raw materials, $ZrCl_2O_8\cdot 8H_2O$ (Wako special grade, Wako Pure Chemical Industries Ltd. (current name: FUJIFILM Corporation, the same applies in the following), $NH_4H_2PO_4$ (reagent special grade, Wako Pure Chemical Industries Ltd.) and $H_2SO_4$ (reagent special grade, Wako Pure Chemical Industries Ltd.) were prepared. Then, $ZrCl_2O\cdot 8H_2O$ and $NH_4H_2PO_4$ were each dissolved in distilled water so as to be 0.8 M. Subsequently, these aqueous solutions (10 ml for each) and 3 ml of $H_2SO_4$ were mixed. The mixture was stirred for 90 minutes by a stirrer (step S1).

After completion of stirring, the aqueous solution (mixture) was poured in a container (HUT-100, SAN-AI Kagaku Co. Ltd.) made of Teflon® and the container was set in an outer cylinder made of pressure-resistant stainless steel (HUS-100, SAN-AI Kagaku Co. Ltd.). The cylinder was placed in a hot air circulation oven (KLO-45M, Koyo Thermo Systems Co., Ltd.) and heated. In this manner, a hydrothermal treatment was carried out (step S2). The hydrothermal treatment was carried out at a temperature of 180° C. for 4 days.

After the hydrothermal treatment, the Teflon container taken out had a white precipitate yield therein, in which a white precipitate was generated. A solution containing the precipitate was poured in an evaporating dish and heated on a heater of about 100° C. to vaporize extra moisture (step S3: first drying process). At this time, the sample was not completely dried due to the content of excessive $H_2SO_4$ and moisture remained. Thus, the evaporating dish containing the sample was placed in an electric furnace (KDF-S80, DENKEN-HIGHDENTAL Co., Ltd.) of 300° C. and dried for further 12 hours (step S4: second drying process). Thereafter, the sample (dried at 300° C.) was placed in an electric furnace (KDF-S80, DENKEN-HIGHDENTAL Co., Ltd.) and baked at 400 to 900° C. for 4 hours or 12 hours. In this manner, white powder samples 1 to 9 were obtained (step S5).

The compositions (atomic ratio) of samples 1 to 9 thus prepared were analyzed by ICP-OES (Inductivity Coupled Plasma Optical Emission Spectrometry).

ICP-OES

ICP-OES apparatus used: 5100 VDV ICP-OES (Agilent Technologies)

ICP ionization unit: Ar plasma

Using standard solutions for Zr, P and S of samples 1 to 9 (all are manufactured by Wako Pure Chemical Industries Ltd.), calibration curves of concentrations of atoms contained in the solutions were prepared. The concentrations of atoms completely dissolved in mixed acid (0.5% HF+5% $HNO_3$) were measured.

FIG. 3 shows the relationships between the baking conditions and atomic ratios with respect to samples 1 to 9. In samples 1 to 9, the atomic ratios of Zr were all the same (value of 2). The atomic ratios of P were almost the same (1.8 to 2). In contrast, the atomic ratio of S varied depending on the baking conditions of samples 1 to 9.

To describe more specifically, in sample 1 (dried only once at 300° C.), the atomic ratio of S was 1.6. In sample 2 (baking conditions: 400° C., 4 hours), the atomic ratio of S was 1.2. In sample 3 (baking conditions: 450° C., 4 hours), the atomic ratio of S was 1. In sample 4 (baking conditions: 500° C., 4 hours), the atomic ratio of S was 0.90. In sample 5 (baking conditions: 500° C., 12 hours), the atomic ratio of S was 0.76. In sample 6 (baking conditions: 600° C., 4 hours), the atomic ratio of S was 0.54. In sample 7 (baking conditions: 700° C., 4 hours), the atomic ratio of S was 0.48. In sample 8 (baking conditions: 800° C., 4 hours), the atomic ratio of S was 0.44. In sample 9 (baking conditions: 900° C., 4 hours), the atomic ratio of S was 0.43.

Figure 4:
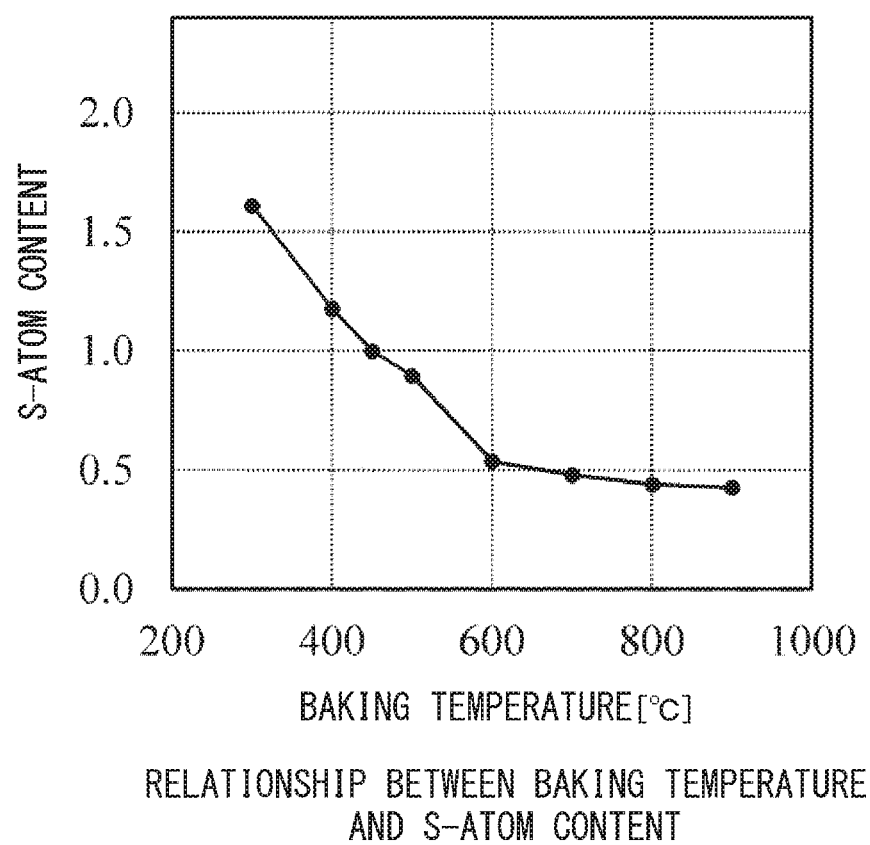
FIG. 4 is a graph showing the relationship between baking temperature of the content of S atoms.

FIG. 4 is a graph showing the relationship between the baking temperature and S-atom content (atomic ratio). In FIG. 4, plots of the baking temperature versus atomic ratio of S (atom) of samples 1 to 4 and 6 to 9 of the table shown in FIG. 3 are drawn. As shown in FIG. 4, as the baking temperature of a sample increased, the content of S decreased. This is because as the baking temperature increases, δ is more easily removed from each sample. From the results of FIG. 4, it was found that the content of S in the sample, in other words, value x of $Zr_2S_xP_2O_{12+\delta}$, can be controlled by controlling the baking temperature.

When sample 4 and sample 5 were compared, the atomic ratio of S was 0.90 in sample 4 (baking conditions: 500° C., 4 hours) and the atomic ratio of S was 0.76 in sample 5 (baking conditions: 500° C., 12 hours). From the result, it is suggested that as the baking time is increased, the content of S decreases. Accordingly, it was found that the content of S in samples can be controlled by controlling baking time.

For determining the crystal structures of samples 1 to 9, X ray diffraction measurement was carried out (XRD: X-ray diffraction).

XRD

Apparatus used: XRD-6100 (Shimadzu Corporation)

Atmosphere: Air

Tube current/tube voltage: 30 mA/40 kV

Target: Cu

Step width: 0.02°

Range of measurement (scanning speed): 10 to 70° (1°/min)

Figure 5:
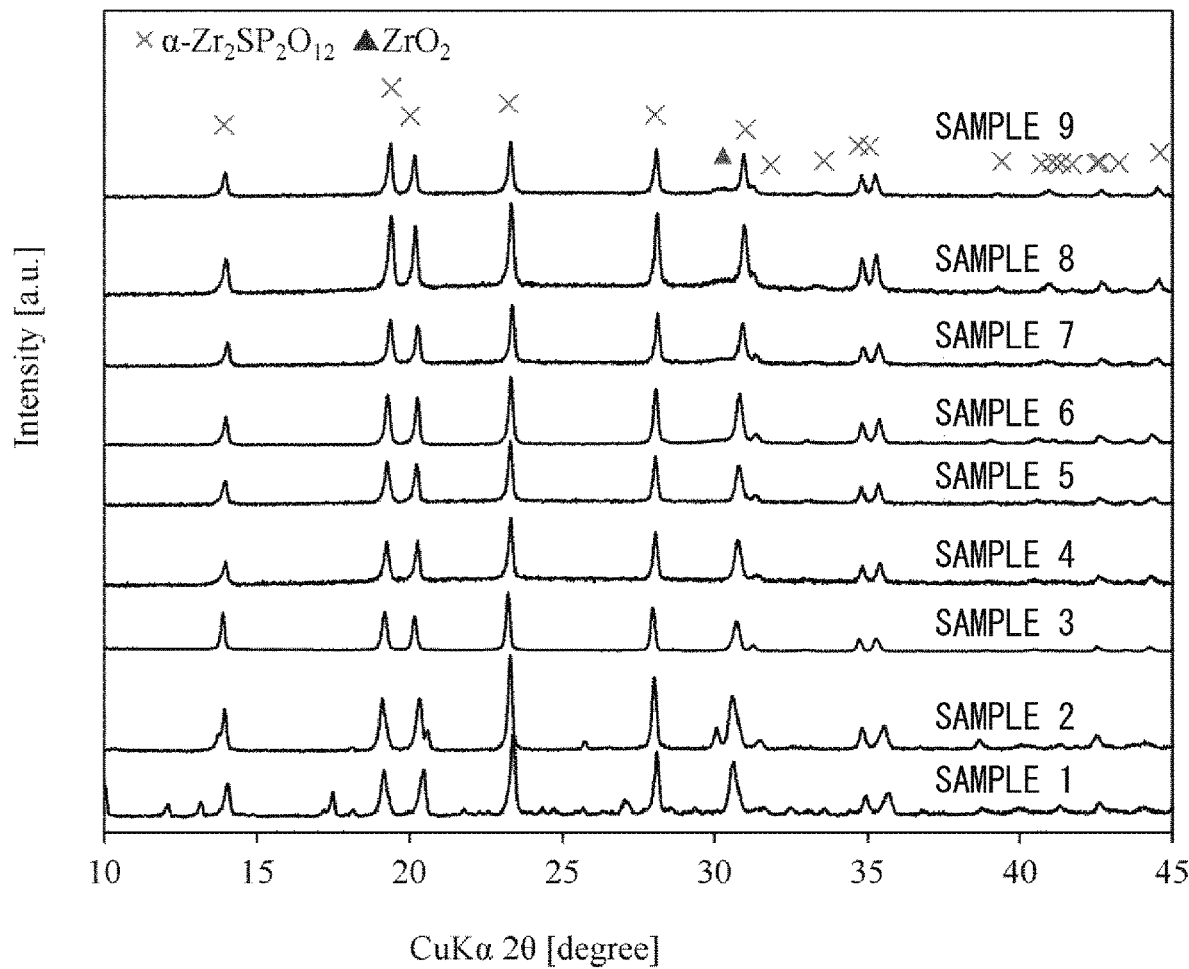
FIG. 5 is a graph showing XRD measurement results of samples.

The XRD measurement results of samples 1 to 9 are shown in FIG. 5. As shown in FIG. 5, $\alpha$-$Zr_2SP_2O_{12}$ (ICDD card number: 04-017-0937) phase was observed in all samples 1 to 9. In samples 7 to 9 obtained by baking at 700° C. or more, a broad peak was observed at around 30.5°. This is presumably a peak of $ZrO_2$. The XRD measurement results suggest that a baking temperature of appropriately 450 to 600° C. is appropriate to obtain single-phase $\alpha$-$Zr_2SP_2O_{12}$.

Figure 6A:
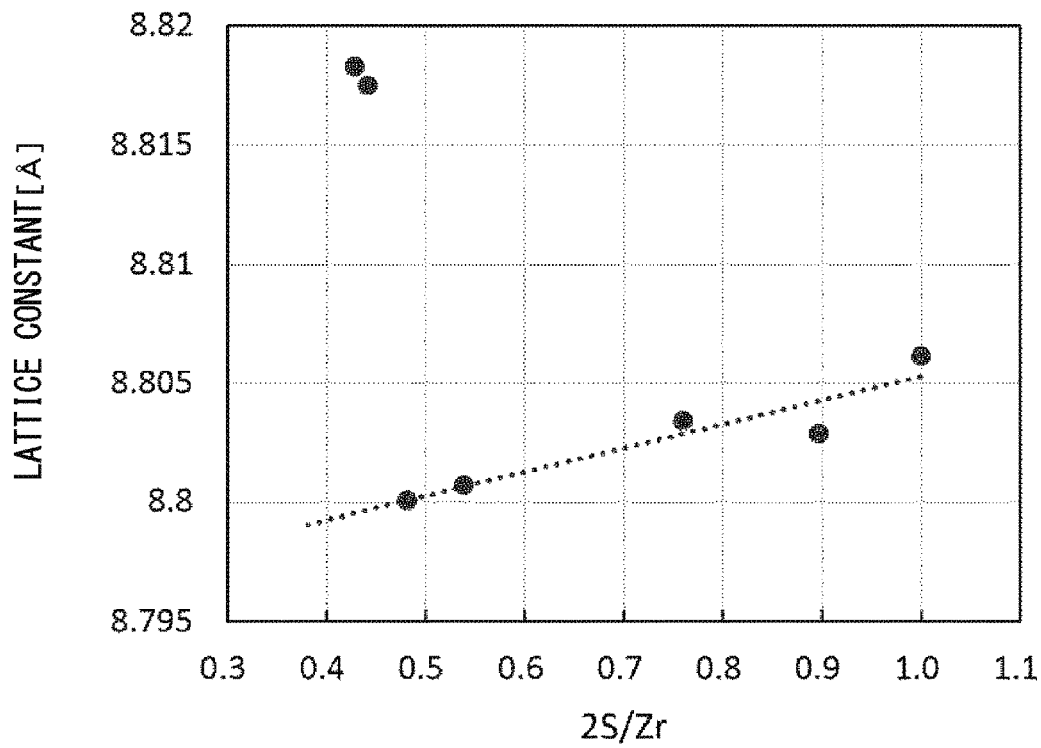
FIG. 6A is a graph showing the relationship between 2S/Zr and lattice constant.
Figure 6B:
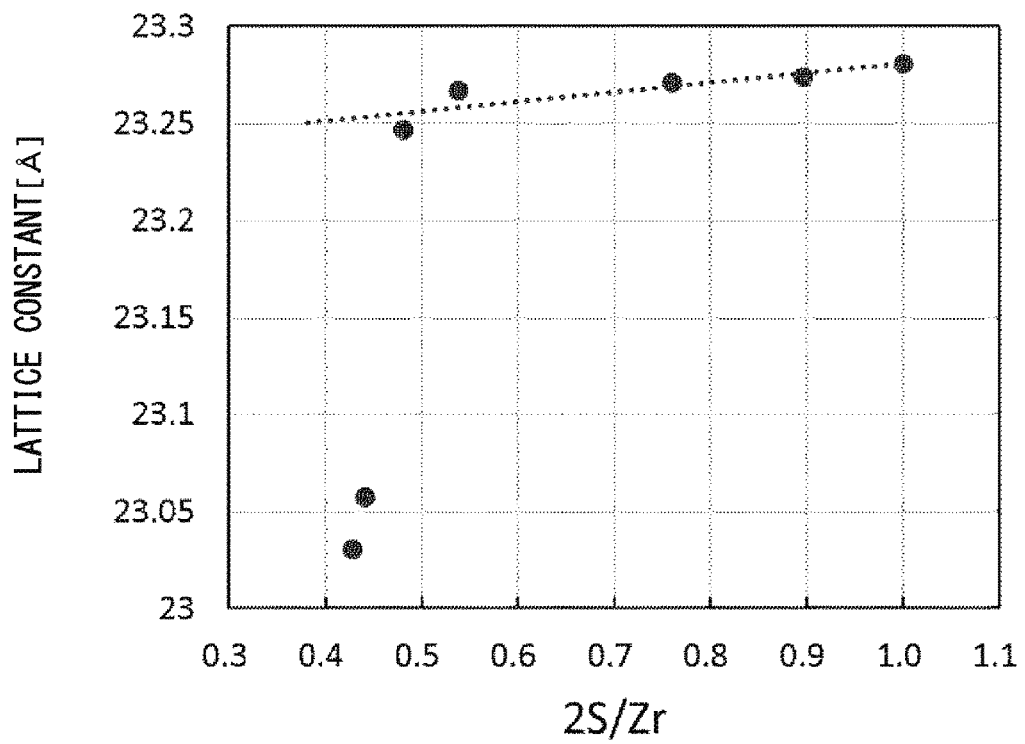
FIG. 6B is a graph showing the relationship between 2S/Zr and lattice constant.

Using the XRD measurement results, the correlation between the content of S and lattice constant was examined. FIG. 6A and FIG. 6B show plots of calculated lattice constants of samples versus the ratio of S (the ratio of 2S normalized by Zr). In FIG. 6A, the vertical axis represents the lattice constant of a axis; whereas, the vertical axis of FIG. 6B represents the lattice constant of c axis. As shown in FIG. 6A and FIG. 6B, the lattice constants of both a axis and c axis linearly decrease as the content of S decreased by half from 1.0 to 0.48. This tendency coincides with the Vegard's law and suggested that even if the content of S decreased by half (0.48), $\alpha$-$Zr_2SP_2O_{12}$ is present as a solid solution. However, when the content of S decreases up to 0.44 or 0.43, plots deviates from the Vegard's law. The lattice constant of a axis increased but that of c axis sharply shrunk. From this, it was found that the cell volume sharply shrinks. From the above results, if the content of S decreases up to around 0.4, it is suggested that the content of S was beyond the lower limit (amount) for forming a solid solution and the phase of $\alpha$-$Zr_2S_xP_2O_{12}$ was decomposed. In consideration that a $ZrO_2$ peak was observed as a result of the XRD measurement of samples 8 and 9, the samples showing a content of S of 0.44 and 0.43 are presumably in the state where $\alpha$-$Zr_2SP_2O_{12}$ and $ZrO_2$ phases are co-present.

The thermal expansion coefficients of samples 1 to 9 were measured by the following method.

The following powder X ray diffractometer was equipped with a bench-top heating stage (BTS 500, AntonPaar) and X ray diffraction patterns at an arbitrary temperature were obtained. Note that, a high speed one-dimensional detector (D/teX Ultra2, company: Rigaku) was used as a detector and measurement was carried out in the following conditions. As the internal standard, Si (NIST SRM 640c) was used.

High Temperature XRD

Apparatus used: Mini Flex 600 (company: Rigaku)

Atmosphere: Air

Tube current/tube voltage: 15 mA/40 kV

Target: Cu

Step width: 0.02°

Range of measurement (scanning speed): 10 to 80° (4°/min)

Measurement temperature: 30 to 500° C. (at intervals of 20° C. in the range of 80 to 220° C. and at intervals of 50° C. in the range of 250° C. or more)

Using the X ray diffraction patterns thus obtained and analysis software (HighScore Plus, PANalytical), crystal structures were refined in accordance with the Rietveld method and lattice constants were calculated. Plots of lattice constant versus temperature are drawn in a graph. In the temperature range where linear approximation was successfully applied, linear thermal expansion coefficients $\alpha_l$ for individual crystal axes and volume thermal expansion coefficients $\alpha_v$ of were calculated in accordance with the following expressions.

$$\alpha_l = \frac{\Delta l}{l_0 \Delta T} \quad \text{[Expression 1]}$$

$$\alpha_V = \frac{\Delta V}{V_0 \Delta T} \quad \text{[Expression 2]}$$

FIG. 1A to FIG. 1C show linear thermal expansion coefficients for the individual crystal axes and volume thermal expansion coefficients. As shown in FIG. 1C, it was found that the volume of $\alpha\text{-Zr}_2\text{SP}_2\text{O}_{12}$ sharply changes from 100° C. to 180° C. In the temperature range, c axis sharply shrunk while a axis expanded, with the result that the volume of the whole lattice sharply shrunk. When the thermal expansion coefficient of sample 4 (x=0.90) was calculated, the linear thermal expansion coefficient (100 to 180° C.) of a axis was +79 ppm/° C.; whereas the linear thermal expansion coefficient (the same temperature range) of c axis was −263 ppm/° C. From these, the volume thermal expansion coefficient (in the same temperature range) thereof was obtained as −108 ppm/° C.

When sample 6 (x=0.54) and sample 7 (x=0.48) were compared to sample 4 (x=0.90), the tendency that as the baking temperature increases and the content of S decreases, a volume change decreases, was observed. The volume thermal expansion coefficient (100 to 180° C.) in sample 6 (x=0.54) was −101 ppm/° C.; whereas, the coefficient of sample 7 (x=0.48) was −94 ppm/° C. The volume thermal expansion coefficient (the temperature range is the same as above) of sample 5 (x=0.76) baked for a long time was −101 ppm/° C. When this value was compared to that of sample 4 (x=0.90), the volume change was found to be small.

In the measurement, when sample 9 (x=0.43) was compared to other samples, the degree of volume shrinkage in the range of 100° C. to 180° C. was low. In sample 9 (x=0.43), the linear thermal expansion coefficient (100 to 180° C.) of a axis was +8.3 ppm/° C.; whereas, the linear thermal expansion coefficient (in the same temperature range) of c axis was −44 ppm/° C. From these, the volume thermal expansion coefficient (in the same temperature range) was calculated as −27 ppm/° C. The content of S in sample 9 (x=0.43) was the smallest and cell volume at room temperature was small compared to other samples.

In the temperature ranges from room temperature to 100° C. and from 180 to 500° C., continuous volume shrinkage was observed. When the thermal expansion coefficient of sample 4 (x=0.90) was calculated, the volume thermal expansion coefficient (30 to 100° C.) was −26 ppm/° C.; the volume thermal expansion coefficient (180 to 350° C.) was −8.1 ppm/° C.; and the volume thermal expansion coefficient (350 to 500° C.) was −13 ppm/° C.

From the above results, it was demonstrated that the material represented by $\alpha\text{-Zr}_2\text{SP}_2\text{O}_{12}$ has a negative thermal expansion coefficient in the range from room temperature to 500° C., and an extremely large negative thermal expansion coefficient particularly in the range of 100 to 180° C.; and that the negative thermal expansion coefficient decreases as the content of S decreases. Since $\alpha\text{-Zr}_2\text{SP}_2\text{O}_{12}$ causes a phase transition from 100° C. to 180° C., it is considered that such an extremely large negative thermal expansion coefficient is exhibited.

Figure 7A:
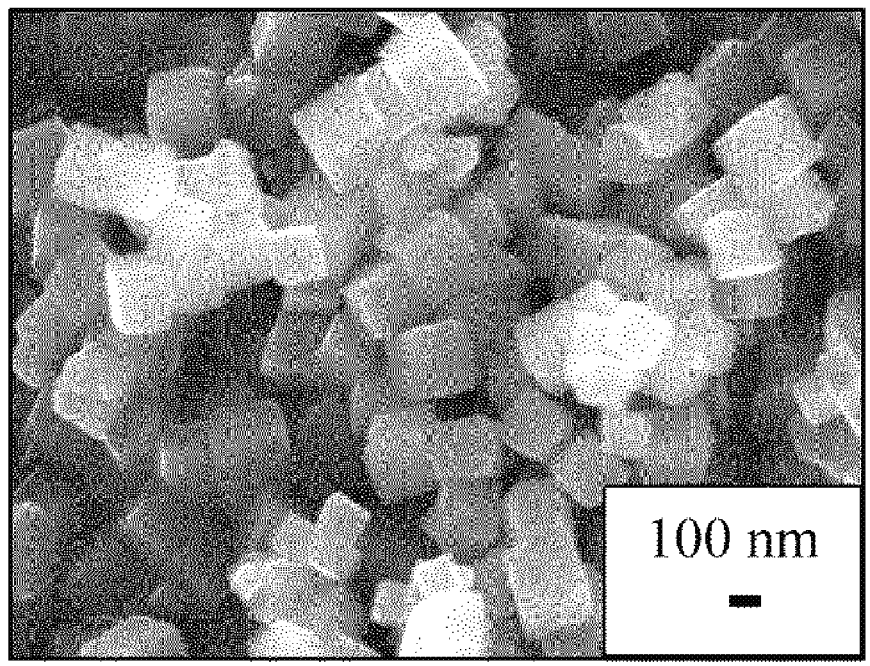
FIG. 7A shows a photograph of an FE-SEM image of sample 4
Figure 7B:
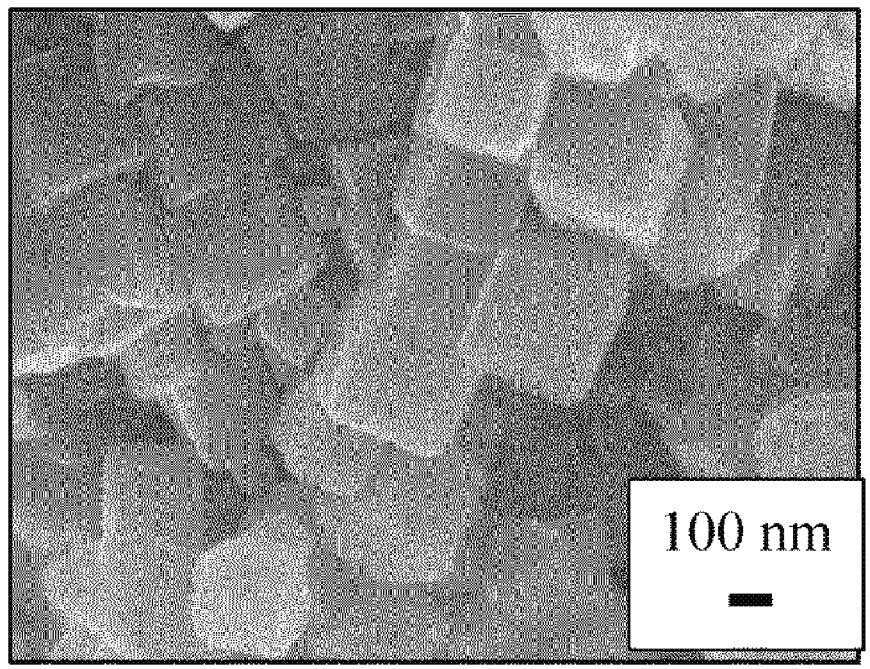
FIG. 7B shows a photograph of an FE-SEM image of sample 4.

Sample 4 was observed by an electron microscope (FE-SEM). The results are shown in FIG. 7A and FIG. 7B. The observation results of FIG. 7B are obtained at a higher magnification than that of FIG. 7A. As shown in FIG. 7A and FIG. 7B, it was found that the particles of sample 4 are cubic particles of 200 to 300 nm on a side and the particle size distribution is narrow.

FE-SEM

Apparatus used: JSM-7500F (JEOL)

Acceleration voltage: 7 to 10 kV

Study on Hydrothermal Treatment Conditions

Optimal conditions for a hydrothermal treatment were examined. More specifically, samples 10 to 25 shown below were prepared and evaluated by using ICP-OES, XRD and FE-SEM. In this manner, optimal conditions for a hydrothermal treatment were examined.

A method for producing samples 10 to 25 are the same as the method for producing samples 1 to 9 except conditions for a hydrothermal treatment. The apparatus used in evaluation for samples are the same as those used for evaluation of samples 1 to 9. In the following tables, hydrothermal treatment conditions, baking conditions and constituent atomic ratios of samples 10 to 25 are shown. Note that, "300° C. (dry)" means that a sample was dried at 300° C. (FIG. 2, step S4) and not subjected to a baking treatment (step S5). The same applies hereinafter.

TABLE 1

| | Hydrothermal treatment | | Baking condition | | Atomic ratio by ICO-OES | | |
|---|---|---|---|---|---|---|---|
| | Temp (° C.) | Time (days) | Temp (° C.) | Time (h) | Zr | P | S |
| Sample 10 | 110 | 2 | 300 (dry) | 12 | 2 | 1.9 | 1.7 |
| Sample 11 | 110 | 2 | 500 | 4 | 2 | 1.9 | 1.1 |
| Sample 12 | 110 | 2 | 700 | 4 | 2 | 2 | 0.8 |
| Sample 13 | 110 | 2 | 900 | 4 | 2 | 1.9 | 0.7 |

TABLE 2

| | Hydrothermal treatment | | Baking condition | | Atomic ratio by ICO-OES | | |
|---|---|---|---|---|---|---|---|
| | Temp (° C.) | Time (days) | Temp (° C.) | Time (h) | Zr | P | S |
| Sample 14 | 130 | 2 | 300 (dry) | 12 | 2 | 1.9 | 2 |
| Sample 15 | 130 | 2 | 500 | 12 | 2 | 1.9 | 0.8 |
| Sample 16 | 130 | 2 | 700 | 4 | 2 | 2 | 0.4 |
| Sample 17 | 130 | 2 | 900 | 4 | 2 | 1.9 | 0.4 |

TABLE 3

| | Hydrothermal treatment | | Baking condition | | Atomic ratio by ICO-OES | | |
|---|---|---|---|---|---|---|---|
| | Temp (° C.) | Time (days) | Temp (° C.) | Time (h) | Zr | P | S |
| Sample 18 | 180 | 2 | 300 (dry) | 12 | 2 | 2 | 2 |
| Sample 19 | 180 | 2 | 500 | 4 | 2 | 2 | 0.9 |
| Sample 20 | 180 | 2 | 700 | 4 | 2 | 2 | 0.5 |
| Sample 21 | 180 | 2 | 900 | 4 | 2 | 2 | 0.4 |

TABLE 4

| | Hydrothermal treatment | | Baking condition | | Atomic ratio by ICO-OES | | |
|---|---|---|---|---|---|---|---|
| | Temp (° C.) | Time (days) | Temp (° C.) | Time (h) | Zr | P | S |
| Sample 22 | 230 | 4 | 300 (dry) | 12 | 2 | 1.7 | 1.8 |
| Sample 23 | 230 | 4 | 500 | 4 | 2 | 1.8 | 0.8 |
| Sample 24 | 230 | 4 | 700 | 4 | 2 | 1.8 | 0.5 |
| Sample 25 | 230 | 4 | 900 | 4 | 2 | 1.9 | 0.4 |

Figure 8:
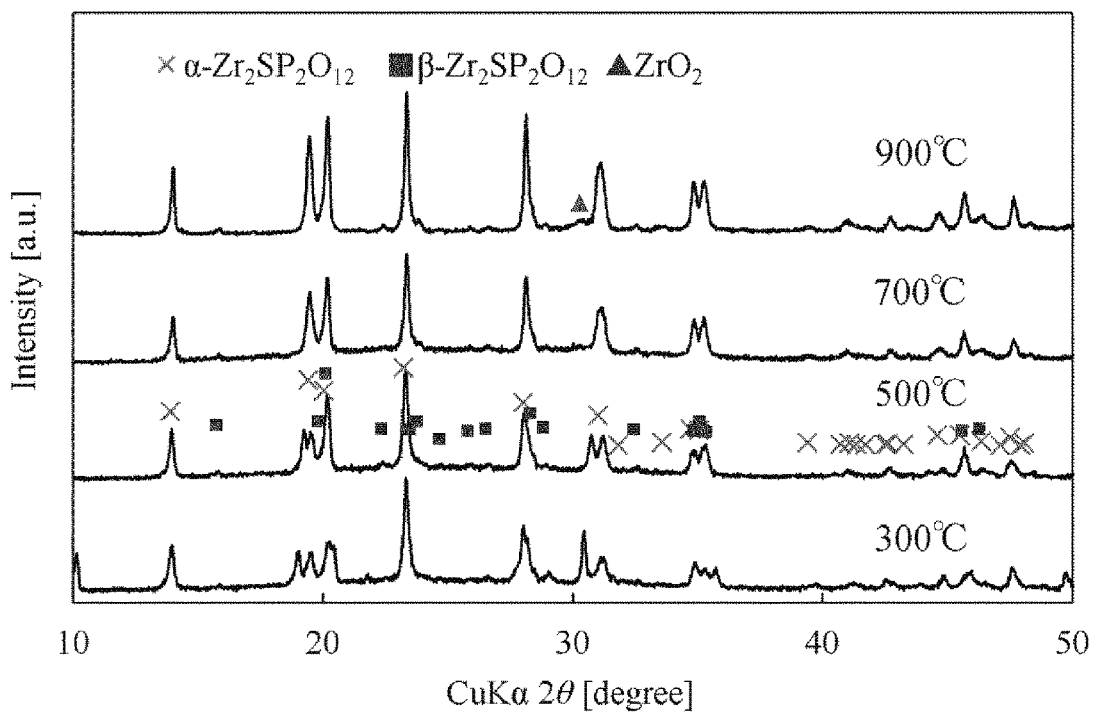
FIG. 8 is a graph showing the XRD measurement results of samples (hydrothermal treatment temperature: 110° C.).

FIG. 8 shows the XRD measurement results of samples 10 to 13 (hydrothermal treatment temperature: 110° C., hydrothermal treatment time: 2 days). In the case where the hydrothermal treatment temperature was 110° C., XRD peaks of $\alpha\text{-}Zr_2SP_2O_{12}$ were observed at any one of baking temperatures of 500° C., 700° C. and 900° C. $\beta\text{-}Zr_2SP_2O_{12}$ (ICDD card: 04-007-8019) was present as a trace impurity. In addition, α phase differs from β phase in crystal system and space group. More specifically, α phase is a rhombohedral system and R-3c; whereas, β phase is an orthorhombic system and Pbcn-60. The values of S in a constituent atom ratio of were calculated as 1.1, 0.8 and 0.7, respectively. These values were large compared to the samples (described later) subjected to hydrothermal treatments at 180° C. and 130° C., suggesting that S remains compared to the samples subjected to a hydrothermal treatment performed in other conditions. This is conceivably because that S was rarely removed even if heated, due to generation of β phase which is more stable than α phase.

Figure 9:
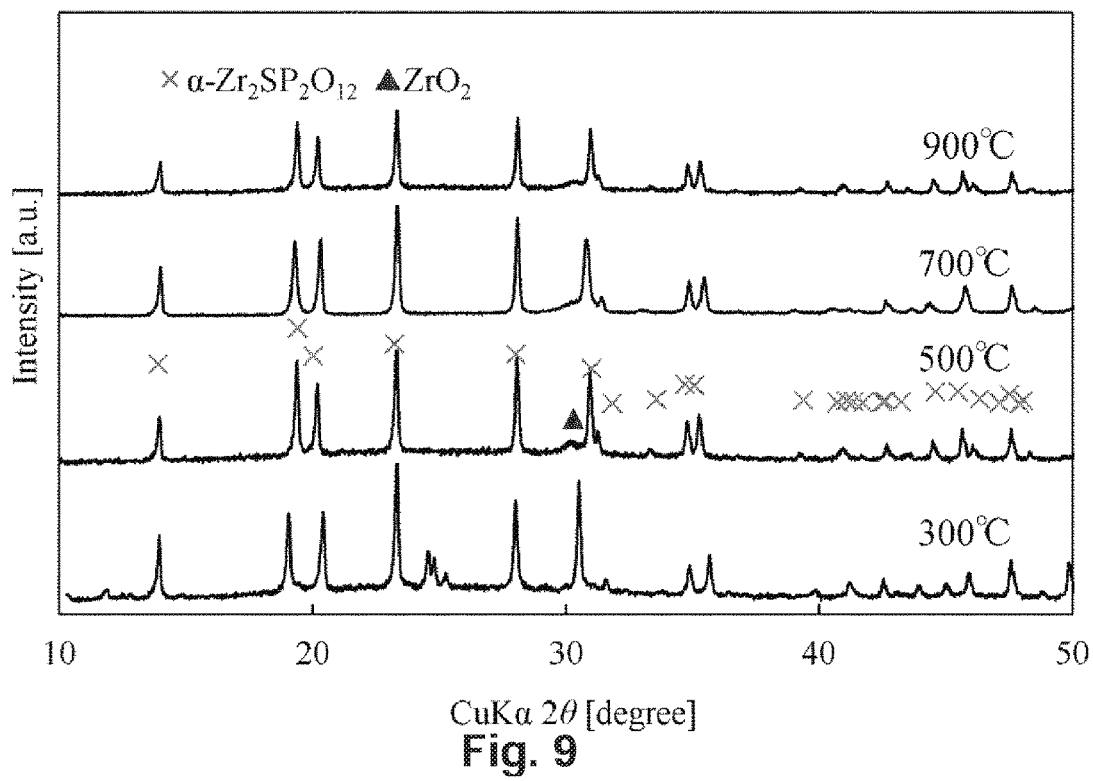
FIG. 9 is a graph showing the XRD measurement results of samples (hydrothermal treatment temperature: 130° C.).

FIG. 9 shows the XRD measurement results of samples 14 to 17 (hydrothermal treatment temperature: 130° C., hydrothermal treatment time: 2 days). In the case where a hydrothermal treatment temperature was 130° C., $\alpha\text{-}Zr_2SP_2O_{12}$ having a satisfactory crystallinity was obtained at a baking temperature of 500° C. and a peak of $ZrO_2$ was observed. As the constituent atomic ratio, Zr:S=2:0.8 was obtained. The content of S was slightly low compared to the theoretical composition. At baking temperatures of 700° C. and 900° C., $\alpha\text{-}Zr_2SP_2O_{12}$ and $ZrO_2$ phases were co-present; however, the value S in the constituent atomic ratio was decreased to 0.4.

Figure 10:
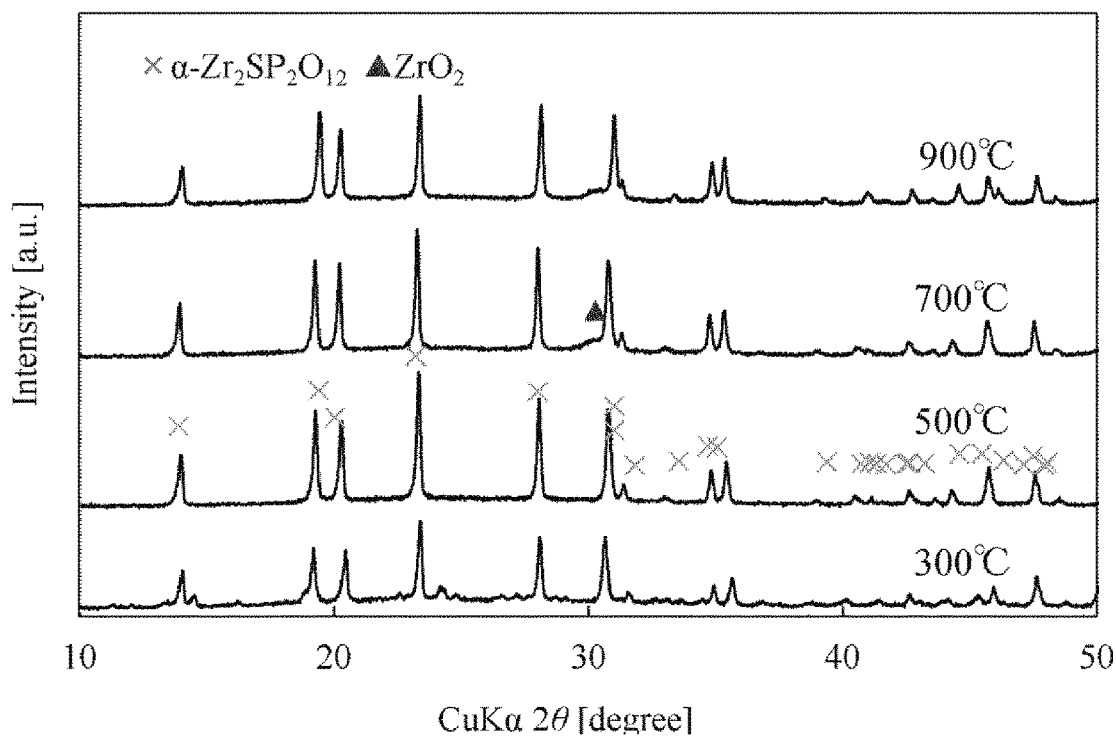
FIG. 10 is a graph showing the XRD measurement results of samples (hydrothermal treatment temperature: 180° C.).

FIG. 10 shows the XRD measurement results of samples 18 to 21 (hydrothermal treatment temperature: 180° C., hydrothermal treatment time: 2 days). In the case where the hydrothermal treatment temperature was 180° C., a single-phase $\alpha\text{-}Zr_2SP_2O_{12}$ was produced by a baking temperature of 500° C. As the constituent atomic ratio, Zr:S=2:0.9 was obtained at a baking temperature of 500° C.; whereas the constituent atomic ratio was reduced to Zr:S=2:0.5 at a baking temperature of 700° C. At a baking temperature of 900° C., the constituent atomic ratio was reduced to Zr:S=2:0.4.

In the case where the hydrothermal treatment temperature was 180° C., samples were prepared by applying a hydrothermal treatment for 0.5 days and 7 days. As a result, in the case where the hydrothermal treatment temperature was 180° C., in all samples prepared by applying a hydrothermal treatment for 0.5 days to 7 days, single-phase $\alpha\text{-}Zr_2SP_2O_{12}$ was produced by baking at 500° C. for 4 hours after the hydrothermal treatment. Thus, at a hydrothermal treatment temperature of 180° C., a hydrothermal treatment was carried out for at least 0.5 days and then baking was carried out. In this manner, single-phase $\alpha\text{-}Zr_2SP_2O_{12}$ can be produced.

Figure 11:
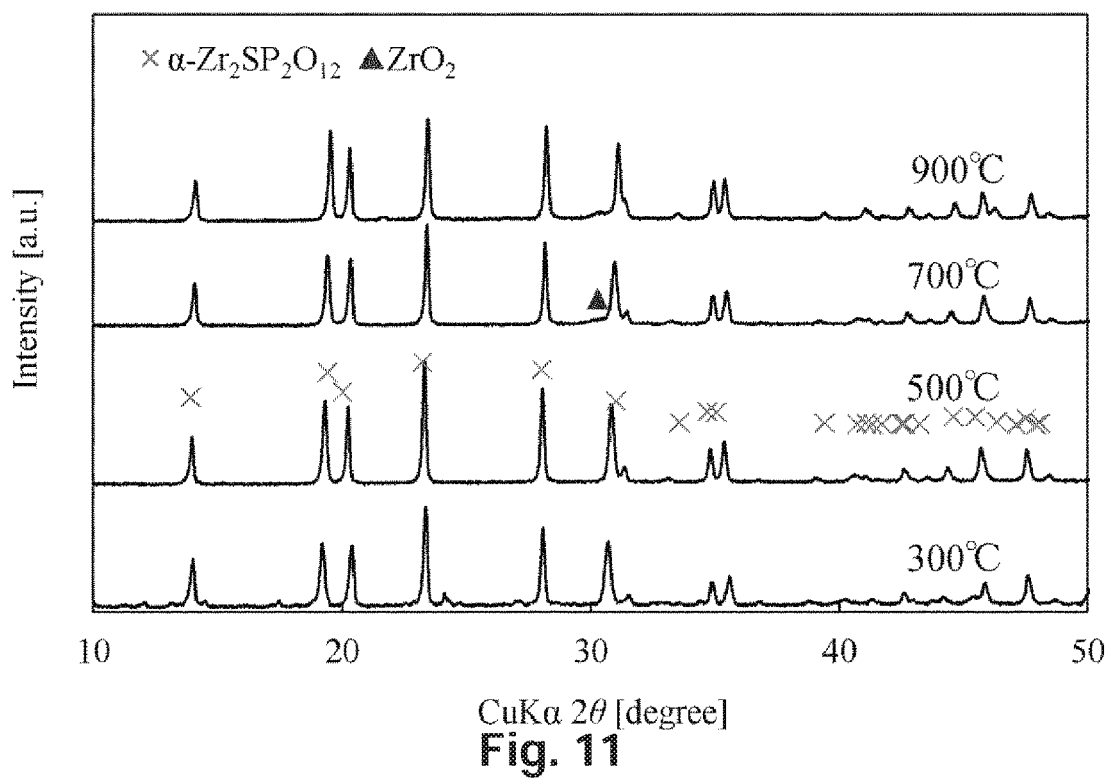
FIG. 11 is a graph showing the XRD measurement results of samples (hydrothermal treatment temperature: 230° C.).

FIG. 11 shows the XRD measurement results of samples 22 to 25 (hydrothermal treatment temperature: 230° C., hydrothermal treatment time: 4 days). In the case where the hydrothermal treatment temperature was 230° C., single-phase $\alpha\text{-}Zr_2SP_2O_{12}$ was produced at a baking temperature of 500° C. The constituent atomic ratio at a baking temperature of 500° C. was Zr:S=2:0.8. The ratio of S in this case was slightly lower than that of the case where the hydrothermal treatment temperature was 180° C.; however, peaks of impurities were not observed. In the case where baking was carried out at 700° C., the constituent atomic ratio was decreased to, Zr:S=2:0.5. In the case where baking was carried out at 900° C., the constituent atomic ratio was decreased to Zr:S=2:0.4.

Figure 12:
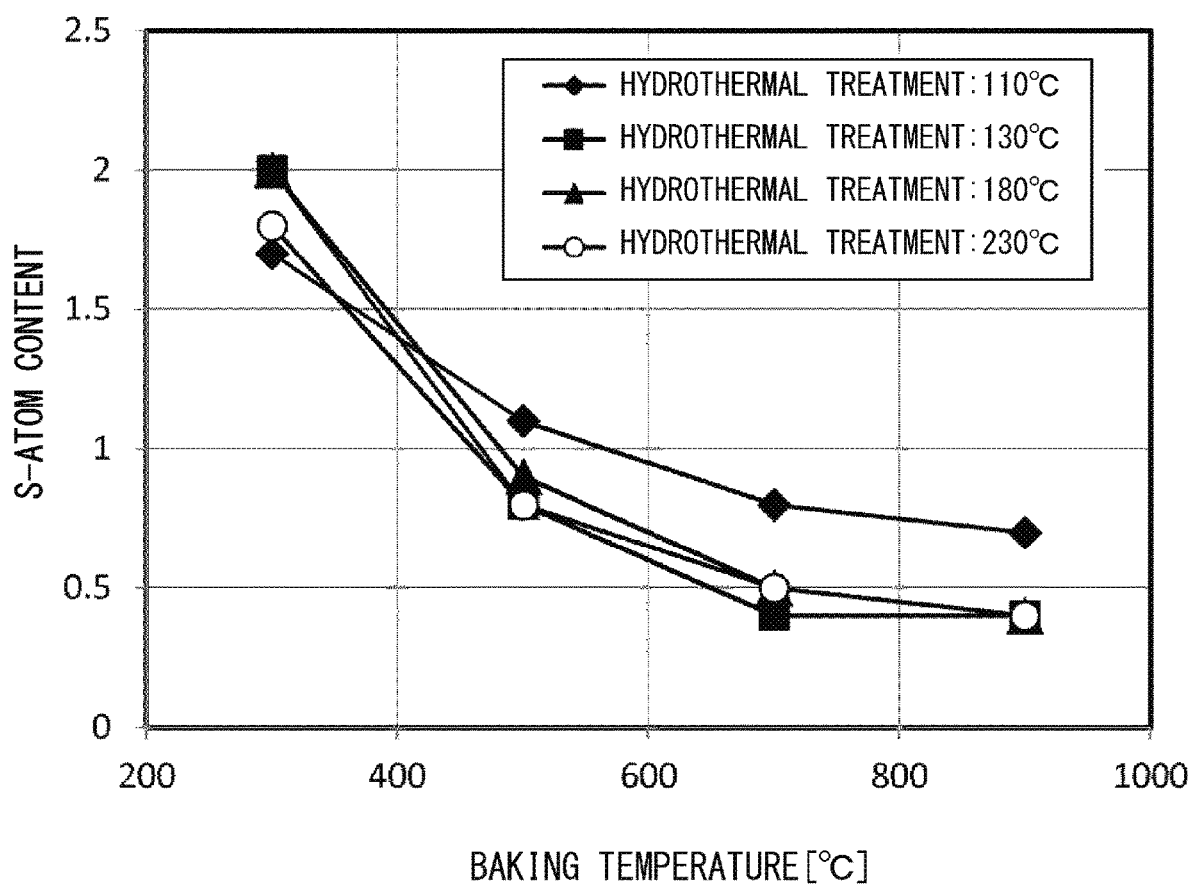
FIG. 12 is a graph showing the relationships between the baking temperatures of the samples hydrothermally treated at separate temperatures and the content of S atoms.

FIG. 12 is a graph showing the relationship between the baking temperatures of samples, which were treated at different hydrothermal treatment temperatures, and the content of S atoms. As shown in FIG. 12, in the case where the hydrothermal treatment temperature was 110° C., the decreasing rate of the content S was slow with an increase of the baking temperature. In consideration of the results of FIG. 12, in the case where the hydrothermal treatment temperature was 130° C. or more, the content of S in a sample can be controlled up to around 0.4 by controlling the baking temperature. In consideration of controlling the composition of $Zr_2SP_2O_{12}$, the hydrothermal treatment temperature is preferably set at 130° C. or more.

Figure 13A:
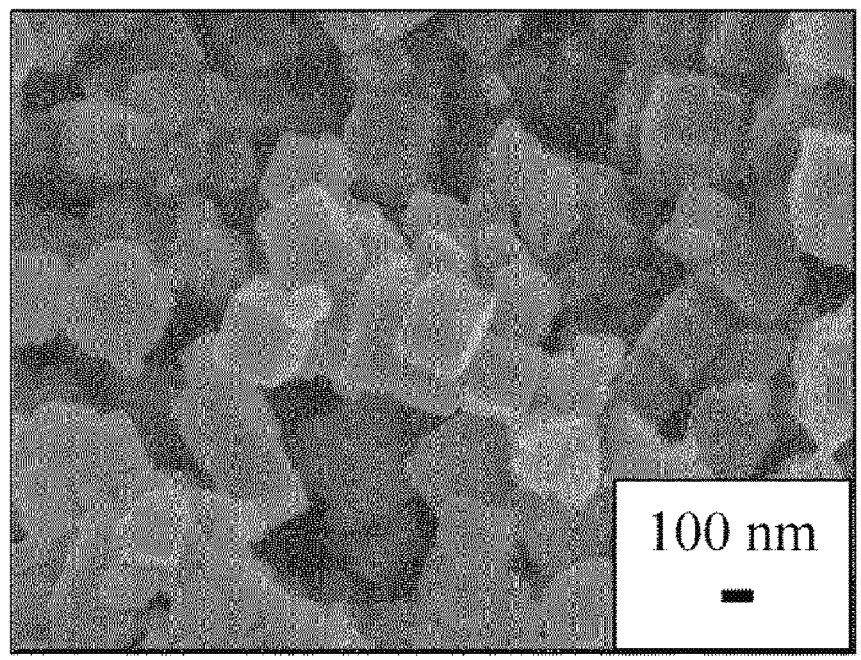
FIG. 13A is a photograph of an FE-SEM image of sample 11 (hydrothermal treatment temperature: 110° C.).
Figure 13B:
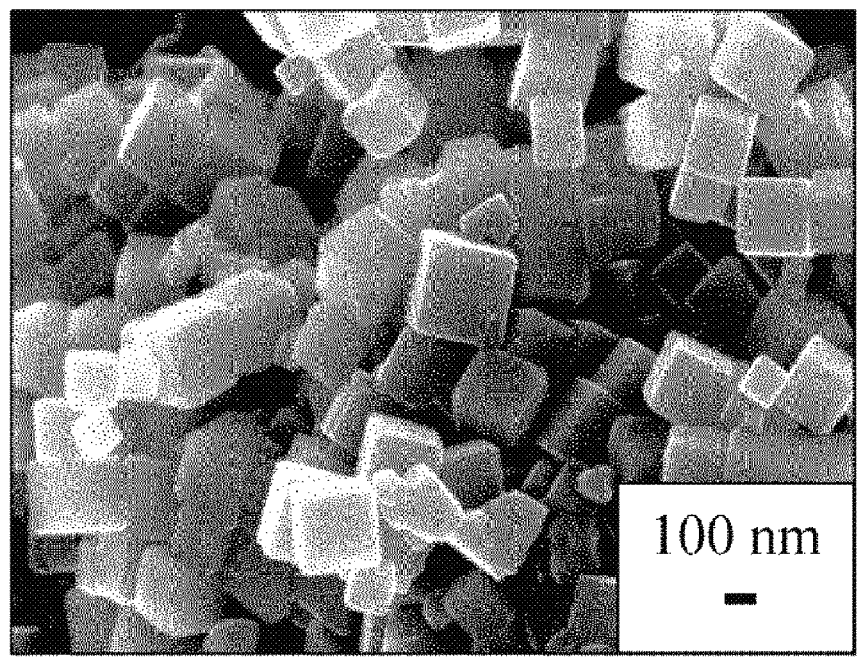
FIG. 13B shows a photograph of an FE-SEM image of sample 19 (hydrothermal treatment temperature: 180° C.).

FIG. 13A shows an image of sample 11 (hydrothermal treatment temperature: 110° C.) observed by an electron microscope (FE-SEM). FIG. 13B shows an image of sample 19 (hydrothermal treatment temperature: 180° C.) observed by an electron microscope (FE-SEM). As shown in FIG. 13A, sample 11 (hydrothermal treatment temperature: 110° C.), many particles, which are conceivably impurities, were attached on the surface of cubic particles of $\alpha\text{-}Zr_2SP_2O_{12}$. In consideration of the peaks of $\beta\text{-}Zr_2SP_2O_{12}$ observed in the XRD measurement results shown in FIG. 8, impurities are probably particles of $\beta\text{-}Zr_2SP_2O_{12}$. In contrast, as shown in FIG. 13B, in the case of sample 19 where hydrothermal treatment temperature was 180° C., cubic particles of 200 to 300 nm on a side were observed. No impurities were found on the surface of the cubic particles.

In consideration of the above results, the hydrothermal treatment temperature is preferably 130° C. or more in order to control the composition of $Zr_2SP_2O_{12}$. As shown in the XRD measurement results of FIG. 10, at a hydrothermal treatment temperature of 180° C., single-phase $\alpha\text{-}Zr_2SP_2O_{12}$ was produced at a baking temperature of 500° C. In order to produce single-phase $\alpha\text{-}Zr_2SP_2O_{12}$, the hydrothermal treatment temperature is preferably 180° C. or more. It was suggested that if a hydrothermal treatment is carried out at 180° C. or more, the shape and size of particles to be produced are not influenced by the hydrothermal treatment temperature.

(2) $Zr_{2-a}Ti_aS_xP_2O_{12+\delta}$

Figure 14:
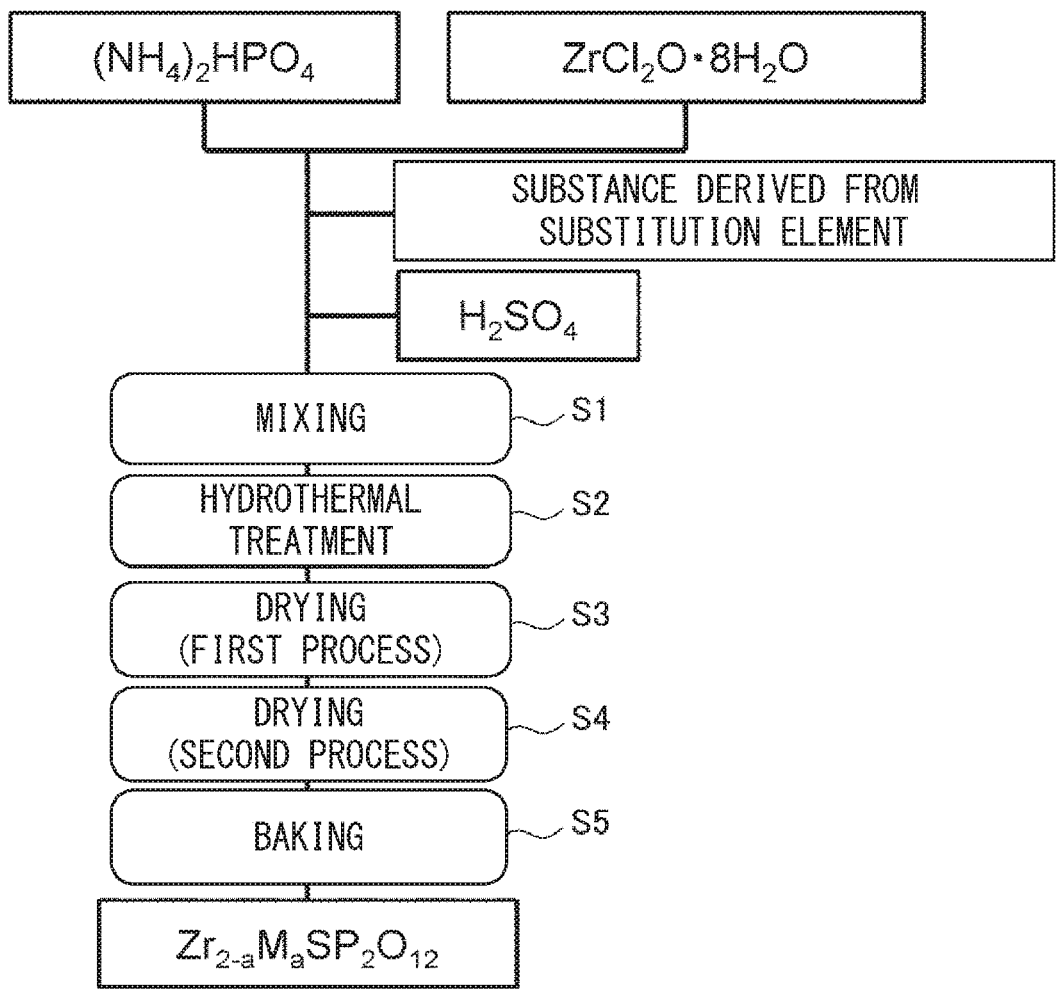
FIG. 14 shows the flowchart of a method for producing a negative thermal expansion material.

A material ($Zr_{2-a}Ti_aS_xP_2O_{12+\delta}$) obtained by substituting part of Zr site with Ti, will be described herein. FIG. 14 is a flowchart showing a method for producing a negative thermal expansion material, more specifically, a method for producing a material obtained by substituting part of Zr site with element M. Note that, like reference symbols are used in the flowchart shown in FIG. 14, to designate like steps corresponding to those like in FIG. 2.

A negative thermal expansion material represented by $Zr_{2-a}Ti_aS_xP_2O_{12+\delta}$ was produced in accordance with the flowchart shown in FIG. 14. First, raw materials, $ZrCl_2O \cdot 8H_2O$ (Wako special grade, Wako Pure Chemical Industries Ltd.), a 30% titanium sulfate (IV) solution (for chemistry, Wako Pure Chemical Industries Ltd.), $(NH_4)_2HPO_4$ (reagent special grade, Kanto Chemical Co., Inc.) and $H_2SO_4$ (reagent special grade, Wako Pure Chemical Industries Ltd.) were prepared. Then, $ZrCl_2O \cdot 8H_2O$ and $(NH_4)_2HPO_4$ were each dissolved in distilled water so as to be 0.8 M. Subsequently, these aqueous solutions (20 ml for each), the 30% titanium sulfate (IV) solution (in an amount corresponding to the ratio represented by "a") and $H_2SO_4$ in an amount (ml) of [6−(the amount of S to be added in the form of titanium sulfate)] were mixed. The mixture was stirred for 90 minutes by a stirrer (step S1). The 30% titanium sulfate (IV) solution used herein corresponds to a substance providing a substitution element shown in FIG. 14.

After completion of stirring, the resultant aqueous solution (mixture) was poured in a container (HUT-100, SAN-AI Kagaku Co. Ltd.) made of Teflon® and the container was set in an outer cylinder made of pressure-resistant stainless steel (HUS-100, SAN-AI Kagaku Co. Ltd.). The cylinder was placed in a hot air circulation oven (KLO-45M, Koyo Thermo Systems Co., Ltd.) and heated. In this manner, a hydrothermal treatment was carried out (step S2). The hydrothermal treatment was carried out at a temperature of 180° C. for 12 hours After the hydrothermal treatment, the Teflon container taken out had a white precipitate yield therein. A solution containing the precipitate was poured in an evaporating dish and heated by a heater of about 100° C. for 5 hours to vaporize extra moisture (step S3: first drying process). At this time, since the sample was not completely dried because of the content of excessive $H_2SO_4$ and moisture remained. Thus, the evaporating dish containing the sample was placed in an electric furnace (KDF-S80, DENKEN-HIGHDENTAL Co., Ltd.) of 300° C. and dried for further 12 hours (step S4: second drying process). Thereafter, the sample dried at 300° C. was placed in an electric furnace (KDF-S80, DENKEN-HIGHDENTAL Co., Ltd.) and baked at 500° C. for 4 hours. In this manner, a white powder sample was obtained (step S5).

Figure 15:
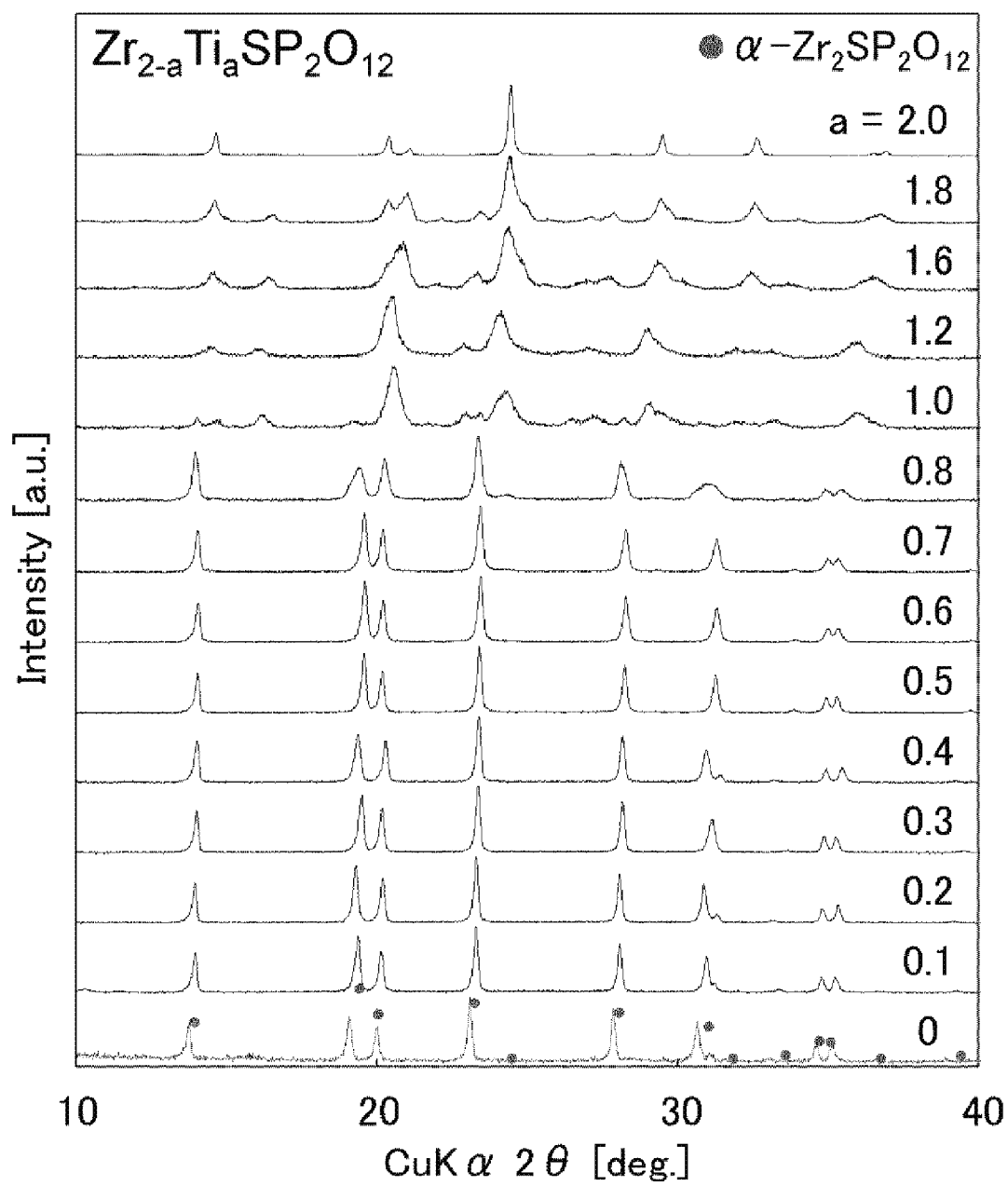
FIG. 15 shows the XRD measurement results of samples obtained by substituting part of Zr site with Ti.

For determining the crystal structures of the samples thus prepared, X ray diffraction measurement was carried out. FIG. 15 shows the XRD measurement results of materials obtained by substituting part of Zr site with Ti ($Zr_{2-a}Ti_aS_xP_2O_{12+\delta}$). Note that, the apparatus and conditions used for XRD measurement are the same as those mentioned above.

In the XRD measurement results shown in FIG. 15, the XRD pattern of a sample where a=0 almost coincided with that of crystal phase (ICDD card number: 04-017-0937) of α-$Zr_2SP_2O_{12}$. In the samples where a=0.8 to 1.8, a phase of impurities except α-$Zr_2SP_2O_{12}$ was confirmed and the peaks thereof were broad. In contrast, samples where a=0.1 to 0.7, an impurity phase was not confirmed and a crystal phase of α-$Zr_2SP_2O_{12}$ alone was confirmed. Accordingly, the samples where value a is 0<a≤0.7, it is considered that part of Zr site was successfully substituted by Ti.

Figures 16, 17:
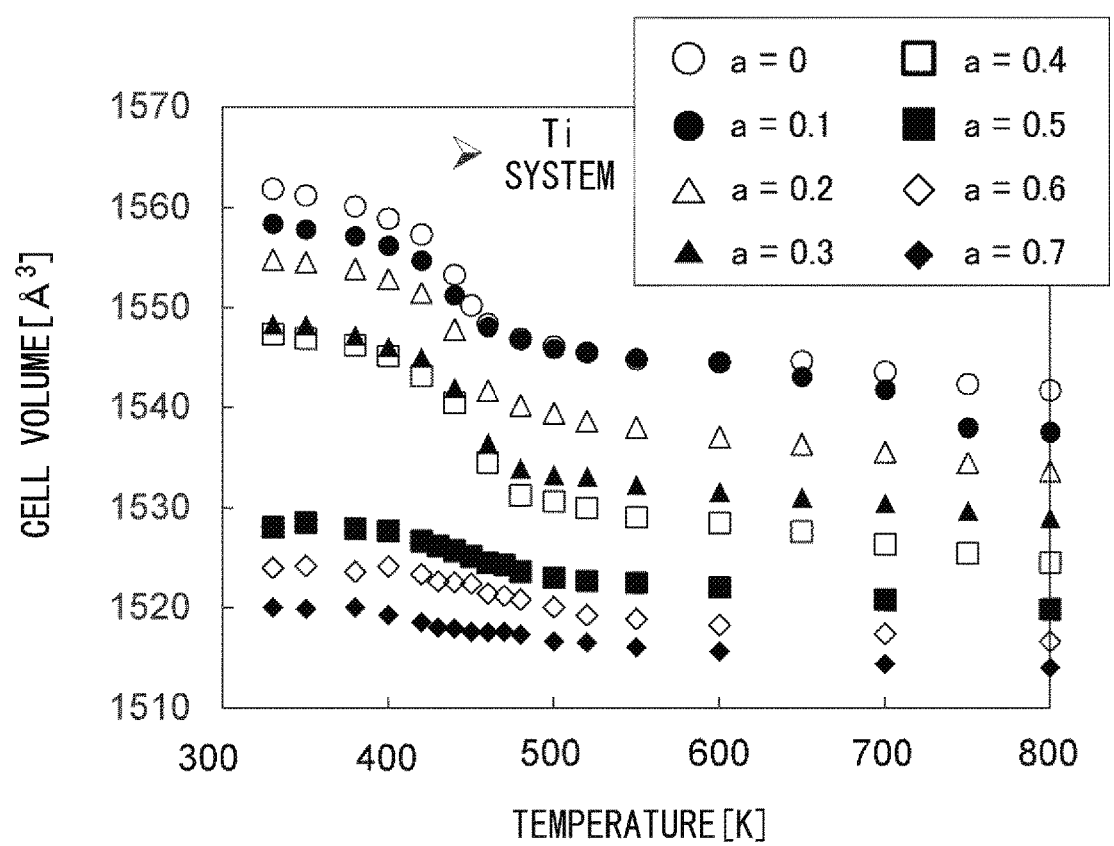
FIG. 16 shows a table showing the compositions of $Zr_{2-a}Ti_aSP_2O_{12}$ used in practice.
FIG. 17 is a graph showing temperature characteristics of $Zr_{2-a}Ti_aSP_2O_{12}$.

The atomic ratios of the samples obtained by substituting part of Zr site with Ti (a=0.1 to 0.7) were determined by an ICP-OES apparatus. FIG. 16 is a table showing the compositions of $Zr_{2-a}Ti_aSP_2O_{12}$ used in practice. Note that, the apparatus and conditions used for XRD measurement are the same as those mentioned above.

As shown in FIG. 16, the ratios of Zr and Ti were normalized by the concentration of S by calculation. At this time, the concentration of S was normalized by setting x=0.9 based on the above results. As shown in FIG. 16, it was confirmed that Ti is present approximately in an stoichiometric ratio. It was suggested that the elements are present approximately in stoichiometric ratios in samples except a=0.1, although the content of Zr is slightly low. The reason why the content of Zr is low in the sample where a=0.1 is considered that Zr alone was not sufficiently dissolved when the sample was dissolved in mixed acid.

The cell volume (thermal expansion coefficient) of the sample obtained by substituting part of Zr site with Ti was obtained by a high-temperature XRD apparatus. FIG. 17 is a graph showing temperature characteristics (temperature dependency of cell volume) of $Zr_{2-a}Ti_aSP_2O_{12}$ prepared. Note that, the apparatus and conditions used for high temperature XRD measurement are the same as those mentioned above.

As shown in FIG. 17, in all samples of $Zr_{2-a}Ti_aSP_2O_{12}$ (a=0.1 to 0.7), the cell volume was low compared to that of $Zr_2SP_2O_{12}$ (a=0). There was a tendency that the cell volume decreases as the content of Ti increases. The ion radius of a tetravalent 6-coordinated Zr ion is 0.72 Å; whereas the ion radius of a tetravalent 6 coordinated Ti ion is 0.605 Å. Accordingly, the reason why the cell volume decreased as the content of Ti increased is considered that part of Zr site is substituted by Ti whose ion radius is smaller than that of Zr.

It was found that the samples where a=0.1 to 0.4 exhibit three-step thermal expansion behavior, similarly to $Zr_2SP_2O_{12}$ (a=0). Accordingly, it is considered that every time the slope of cell volume changes, a negative thermal expansion coefficient due to framework-phase transition-framework is shown. As shown in FIG. 17, the temperature range in which volume shrinkage due to phase transition is shown, tends to be large in samples of $Zr_2SP_2O_{12}$ where a=0.1 to 0.4 than $Zr_2SP_2O_{12}$ where (a=0).

In contrast, in the samples where a=0.5 to 0.7, the volume shrinkage of a portion causing a phase transition significantly decreased. Compared to the samples where a=0.1 to 0.4, cell volumes in the beginning of the measurement (low temperature side) significantly decreased. In the sample where a=0.7, as long as a change in cell volume is concerned, volume shrinkage due to phase transition was not substantially confirmed. Because of this, it is deemed that the conditions of the samples where a=0.1 to 0.4 may significantly differ from those of the samples where a=0.5 to 0.7.

Figure 18:
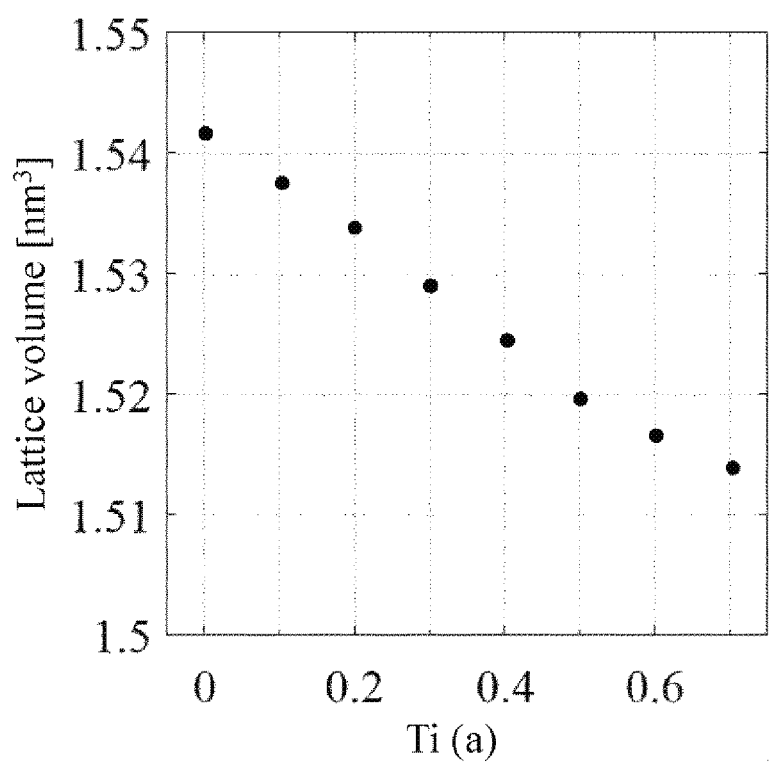
FIG. 18 is a graph showing the relationship between the content of Ti and the cell volume.

The lattice constant at room temperature varies depending on the content of Ti. However, in all samples at 773K, it was confirmed that as the content of Ti increases, the cell volume decreases at regular intervals. The relationship between the content of Ti and cell volume is shown in FIG. 18. As shown in FIG. 18, it was suggested that the content of Ti and the decrease of cell volume has a linear relationship, and confirmed that they follow the Vegard's law.

With respect to samples of $Zr_{2-a}Ti_aSP_2O_{12+\delta}$ (a=0.1 to 0.7), temperature dependency of lattice constant of a axis are c axis were examined. As a result, in all samples, variation in lattice constant of c axis was larger than that of a axis. The results were the same as in the above results of $\alpha$-$Zr_2SP_2O_{12}$ (see, FIG. 1).

FIG. 19 is a graph collectively showing thermal expansion coefficients of samples ($Zr_{2-a}Ti_aSP_2O_{12}$: a=0.1 to 0.7) obtained by substituting part of Zr site with Ti, at individual temperature ranges. In FIG. 19, ZSP represents a sample where a=0. As shown in FIG. 19, it is found that the thermal expansion coefficient of $Zr_{2-a}Ti_aSP_2O_{12+\delta}$ (a=0.1 to 0.7) varies in different temperature ranges. In a negative thermal expansion material according to the present invention, since thermal expansion coefficient varies depending on the composition of Ti, the composition of the material can be appropriately selected depending on the intended use.

(3) $Zr_{2-a}Ce_aS_xP_2O_{12+\delta}$

A material ($Zr_{2-a}Ce_aS_xP_2O_{12+\delta}$) obtained by substituting part of Zr site with Ce, will be described herein.

A negative thermal expansion material represented by $Zr_{2-a}Ce_aS_xP_2O_{12+\delta}$ was produced also in accordance with the flowchart shown in FIG. 14. First, raw materials, $ZrCl_2O \cdot 8H_2O$ (Wako special grade, Wako Pure Chemical Industries Ltd.), cerium sulfate tetrahydrate (Wako special grade, Wako Pure Chemical Industries Ltd.), $NH_4H_2PO_4$ (reagent special grade, Wako Pure Chemical Industries Ltd.) and $H_2SO_4$ (reagent special grade, Wako Pure Chemical Industries Ltd.) were prepared. Then, $ZrCl_2O \cdot 8H_2O$ and $(NH_4)_2HPO_4$ were each dissolved in distilled water so as to be 0.8 M. Subsequently, each (10 ml) of these aqueous solutions, cerium sulfate tetrahydrate (in an amount corresponding to the ratio represented by "a") and $H_2SO_4$ (3 ml) were mixed. The mixture was stirred for 90 minutes by a stirrer (step S1). The cerium sulfate tetrahydrate used herein corresponds to a substance derived from a substitution element shown in FIG. 14. Note that, the following steps of the method are the same as those of the method for producing a negative thermal expansion material represented by $Zr_{2-a}Ti_aS_xP_2O_{12+\delta}$ and any further explanation is omitted for brevity's sake.

Figure 20:
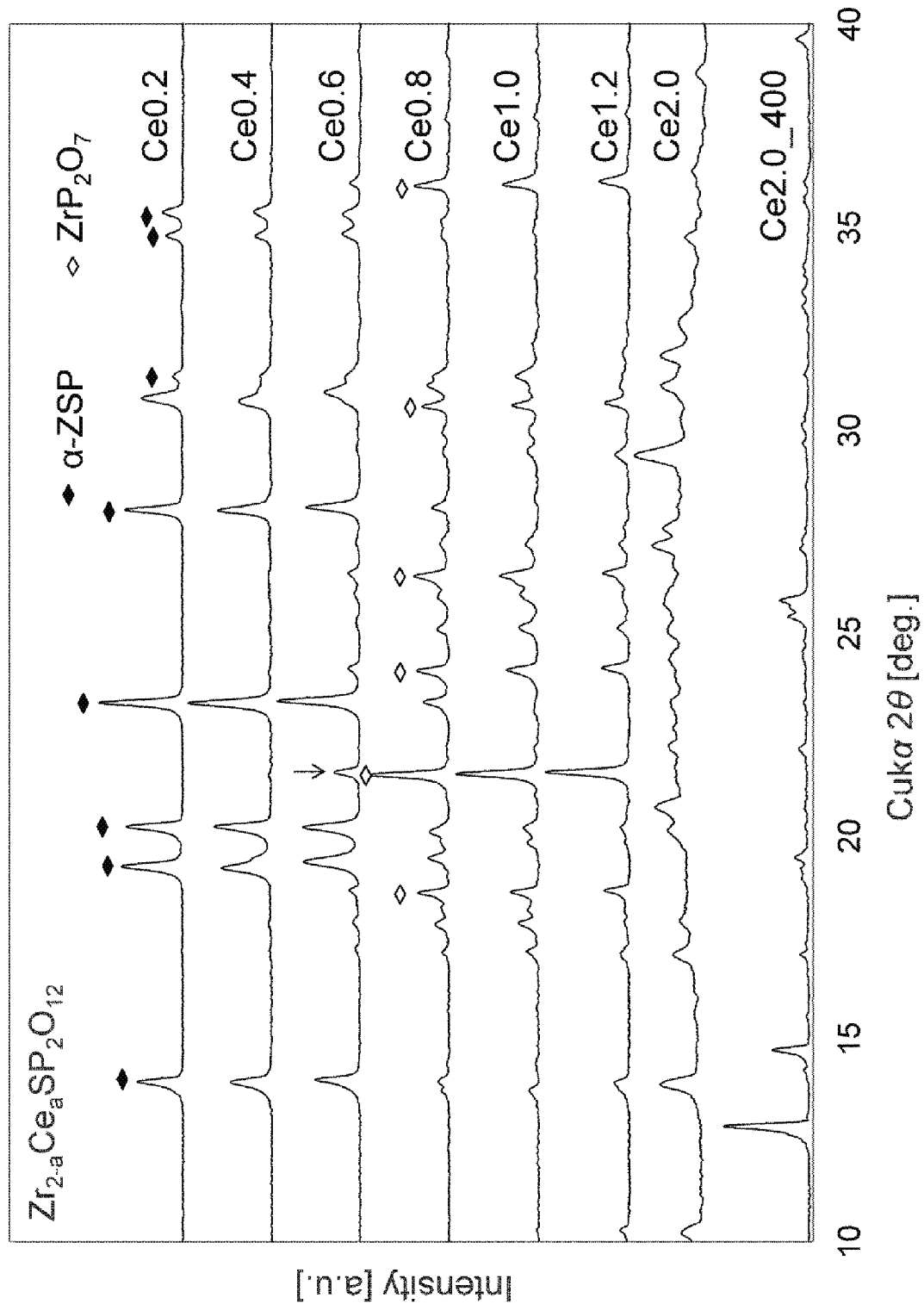
FIG. 20 is a graph showing the XRD measurement results of samples obtained by substituting part of Zr site with Ce.

For determining the crystal structures of the samples thus prepared, X ray diffraction measurement was carried out. FIG. 20 shows the XRD measurement results of a material ($Zr_{2-a}Ce_aS_xP_2O_{12+\delta}$) obtained by substituting part of Zr site with Ce. Note that, the apparatus and conditions used for XRD measurement the same as those mentioned above.

In the XRD measurement results shown in FIG. 20, a crystal phase of $\alpha$-$Zr_2SP_2O_{12}$ ($\alpha$-ZSP) was confirmed in samples where a=0.2 to 0.6 (Ce 0.2 to 0.6). In contrast, in samples where the content of Ce is a=0.6 or more, a crystal phase of $ZrP_2O_7$ was confirmed. Accordingly, in the sample where a is 0<a≤0.4, it is considered that part of Zr site was successfully substituted by Ce.

Figure 21:
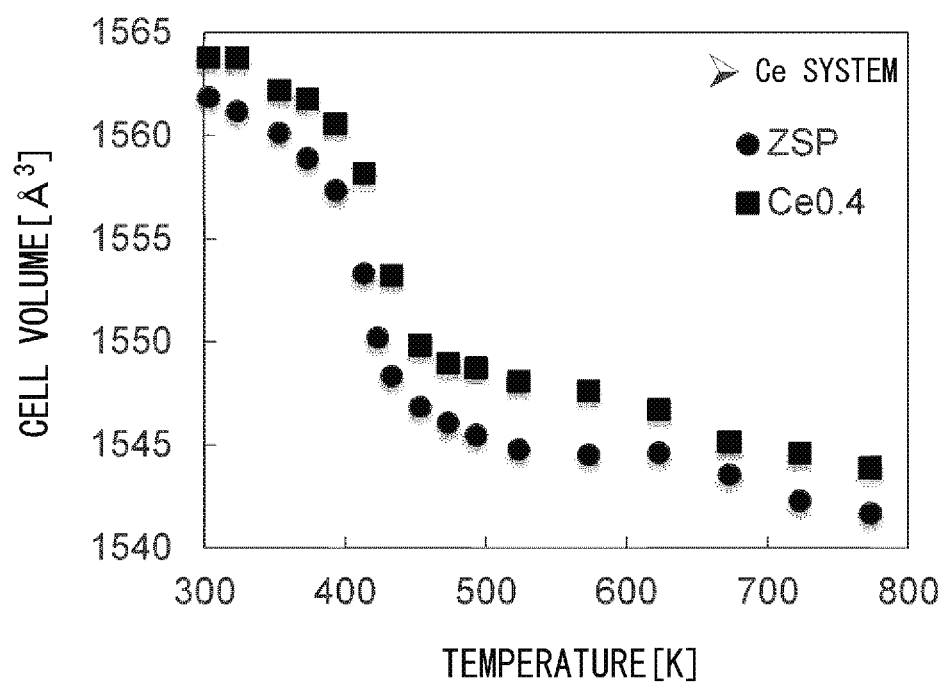
FIG. 21 is a graph showing the temperature characteristics of $Zr_{2-a}Ce_aSP_2O_{12}$.

The cell volumes (thermal expansion coefficient) of the samples obtained by substituting part of Zr site with Ce were obtained by a high-temperature XRD apparatus. FIG. 21 is a graph showing temperature characteristics (temperature dependency of cell volume) of $Zr_{2-a}Ce_aSP_2O_{12}$ prepared. Note that, the apparatus and conditions used for high temperature XRD measurement are the same as those mentioned above.

As shown in FIG. 21, in a sample of $Zr_{2-a}Ce_aSP_2O_{12}$ (a=0.4), the cell volume was large compared to that of $Zr_2SP_2O_{12}$ (ZSP). With respect to the temperature dependency of cell volume, the same behavior as in $Zr_2SP_2O_{12}$ (ZSP) was shown. More specifically, it was found that $Zr_{2-a}Ce_aSP_2O_{12}$ (a=0.4) exhibits three-step thermal expansion behavior similarly to $Zr_2SP_2O_{12}$ (ZSP). Accordingly, it is considered that every time the slope of cell volume changes, a negative thermal expansion coefficient due to framework-phase transition-framework is shown.

(4) $Zr_{2-a}Mn_aS_xP_2O_{12+\delta}$

A material ($Zr_{2-a}Mn_aS_xP_2O_{12+\delta}$) obtained by substituting part of Zr site with Mn, will be described herein.

A negative thermal expansion material represented by $Zr_{2-a}Mn_aS_xP_2O_{12+\delta}$ was produced also in accordance with the flowchart shown in FIG. 14. First, raw materials, $ZrCl_2O \cdot 8H_2O$ (Wako special grade, Wako Pure Chemical Industries Ltd.), manganese dioxide ($MnO_2$) (reagent special grade, KOKUSAN CHEMICAL CO., LTD.), $(NH_4)_2HPO_4$ (reagent special grade, Kanto Chemical Co., Inc.) and $H_2SO_4$ (reagent special grade, Wako Pure Chemical Industries Ltd.) were prepared. Then, $ZrCl_2O \cdot 8H_2O$ and $(NH_4)_2HPO_4$ were each dissolved in distilled water so as to be 0.8 M. Subsequently, each (10 ml) of these aqueous solutions, manganese dioxide ($MnO_2$) (in an amount corresponding to the ratio represented by "a") and $H_2SO_4$ (3 ml) were mixed. The mixture was stirred for 90 minutes by a stirrer (step S1). The manganese dioxide ($MnO_2$) used herein corresponds to a substance derived from a substitution element shown in FIG. 14. Note that, the following steps of the method are the same as those of the method for producing a negative thermal expansion material represented by $Zr_{2-a}Ti_aS_xP_2O_{12+\delta}$ and any further explanation is omitted for brevity's sake.

Figure 22:
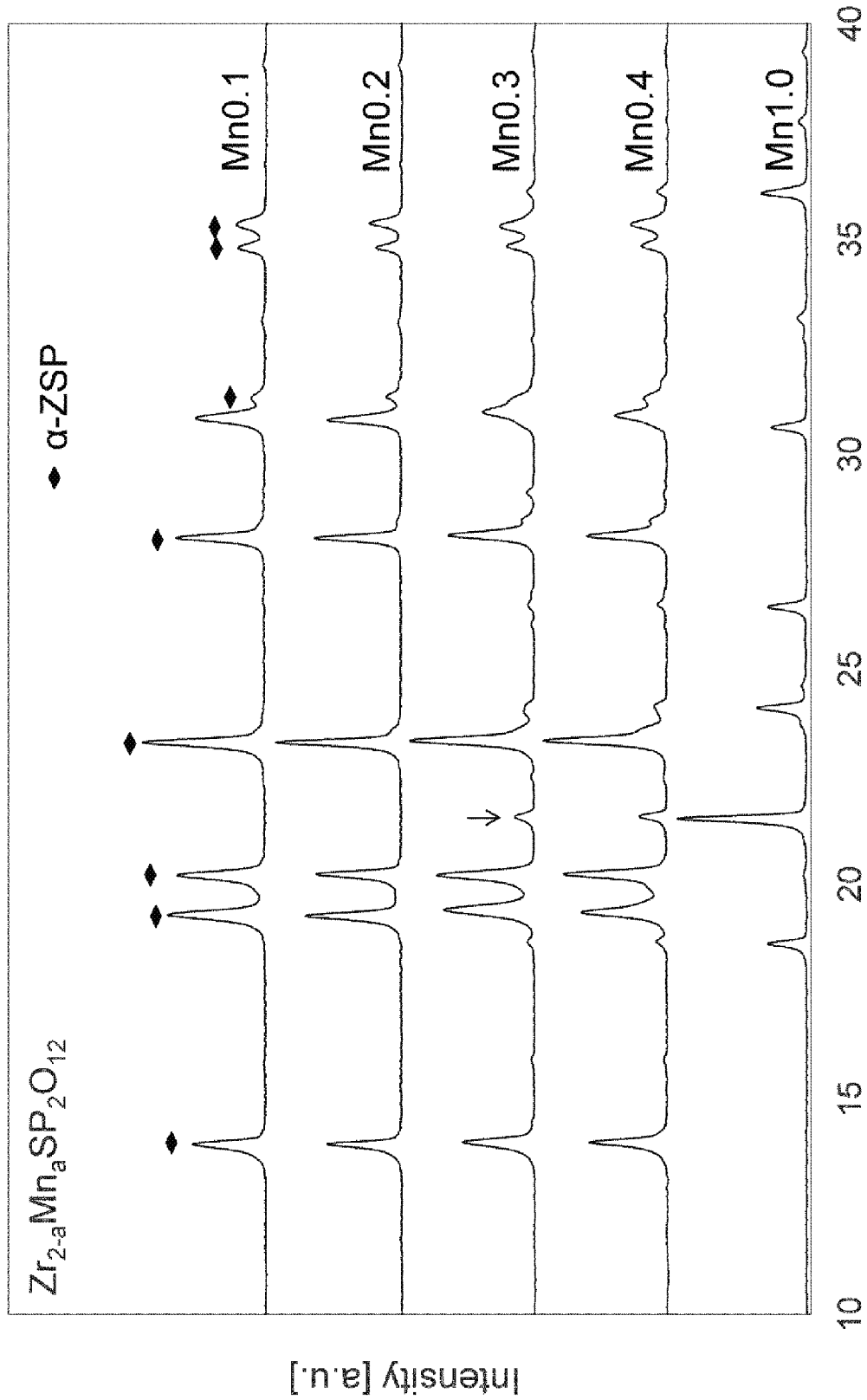
FIG. 22 is a graph showing the XRD measurement results of samples obtained by substituting part of Zr site with Mn.

For determining the crystal structures of the samples thus prepared, X ray diffraction measurement was carried out. FIG. 22 shows the XRD measurement results of a material ($Zr_{2-a}Mn_aS_xP_2O_{12+\delta}$) obtained by substituting part of Zr site with Mn. Note that, the apparatus and conditions used for XRD measurement the same as those mentioned above.

In the XRD measurement results shown in FIG. 22, crystal phase of $\alpha$-$Zr_2SP_2O_{12}$ ($\alpha$-ZSP) was confirmed in samples where a=0.1 to 0.4 (Mn 0.1 to 0.4). In contrast, in samples where the content of Mn is a=0.3 or more, an impurity phase (indicated by an arrow) was confirmed. Accordingly, in the sample where a is 0<a≤0.2, it is considered that part of Zr site was successfully substituted by Mn.

Figure 23:
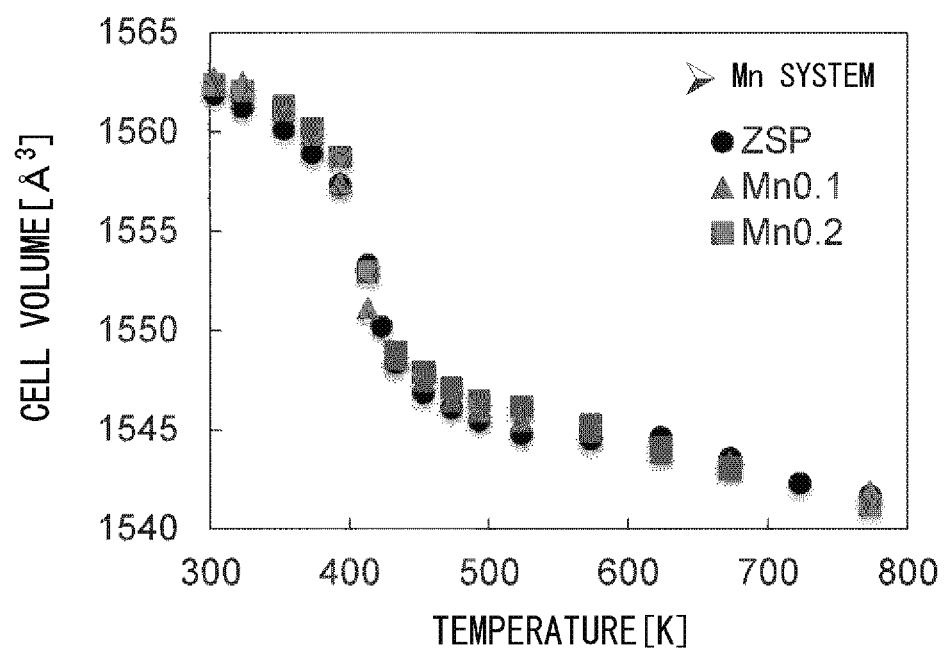
FIG. 23 is a graph showing the temperature characteristics of $Zr_{2-a}Mn_aSP_2O_{12}$.

The cell volume (thermal expansion coefficient) of the sample obtained by substituting part of Zr site with Mn was obtained by a high-temperature XRD apparatus. FIG. 23 is a graph showing temperature characteristics (temperature dependency of cell volume) of $Zr_{2-a}Mn_aSP_2O_{12}$ prepared. Note that, the apparatus and conditions used for high temperature XRD measurement are the same as those mentioned above.

As shown in FIG. 23, in samples of $Zr_{2-a}Mn_aSP_2O_{12}$ (a=0.1, a=0.2), the cell volume thereof were almost equal to that of $Zr_2SP_2O_{12}$ (ZSP). With respect to the temperature dependency of cell volume, the same behavior as in $Zr_2SP_2O_{12}$ (ZSP) was shown. More specifically, it was found that $Zr_{2-a}Mn_aSP_2O_{12}$ (a=0.1, a=0.2) exhibits three-step thermal expansion behavior similarly to $Zr_2SP_2O_{12}$ (ZSP). Accordingly, it is considered that every time the slope of cell volume changes, a negative thermal expansion coefficient due to framework-phase transition-framework is shown.

(5) $Zr_{2-a}Sn_aS_xP_2O_{12+\delta}$

A material ($Zr_{2-a}Sn_aS_xP_2O_{12+\delta}$) obtained by substituting part of Zr site with Sn, will be described herein.

A negative thermal expansion material represented by $Zr_{2-a}Sn_aS_xP_2O_{12+\delta}$ was produced also in accordance with the flowchart shown in FIG. 14. First, raw materials, $ZrCl_2O \cdot 8H_2O$ (Wako special grade, Wako Pure Chemical Industries Ltd.), tin oxide ($SnO_2$) (special grade based on the manufacturer standard, Kanto Chemical Co., Inc.), $(NH_4)_2HPO_4$ (reagent special grade, Kanto Chemical Co., Inc.) and $H_2SO_4$ (reagent special grade, Wako Pure Chemical Industries Ltd.) were prepared. Then, $ZrCl_2O \cdot 8H_2O$ and $(NH_4)_2HPO_4$ were each dissolved in distilled water so as to be 0.8 M. Subsequently, each (10 ml) of these aqueous solutions, tin oxide ($SnO_2$) (in an amount corresponding to the ratio represented by "a") and $H_2SO_4$ (3 ml) were mixed. The mixture was stirred for 90 minutes by a stirrer (step S1). The tin oxide ($SnO_2$) used herein corresponds to a substance derived from a substitution element shown in FIG. 14. Note that, the following steps of the method are the same as those of the method for producing a negative thermal expansion material represented by $Zr_{2-a}Ti_aS_xP_2O_{12+\delta}$ and any further explanation is omitted for brevity's sake.

Figure 24:
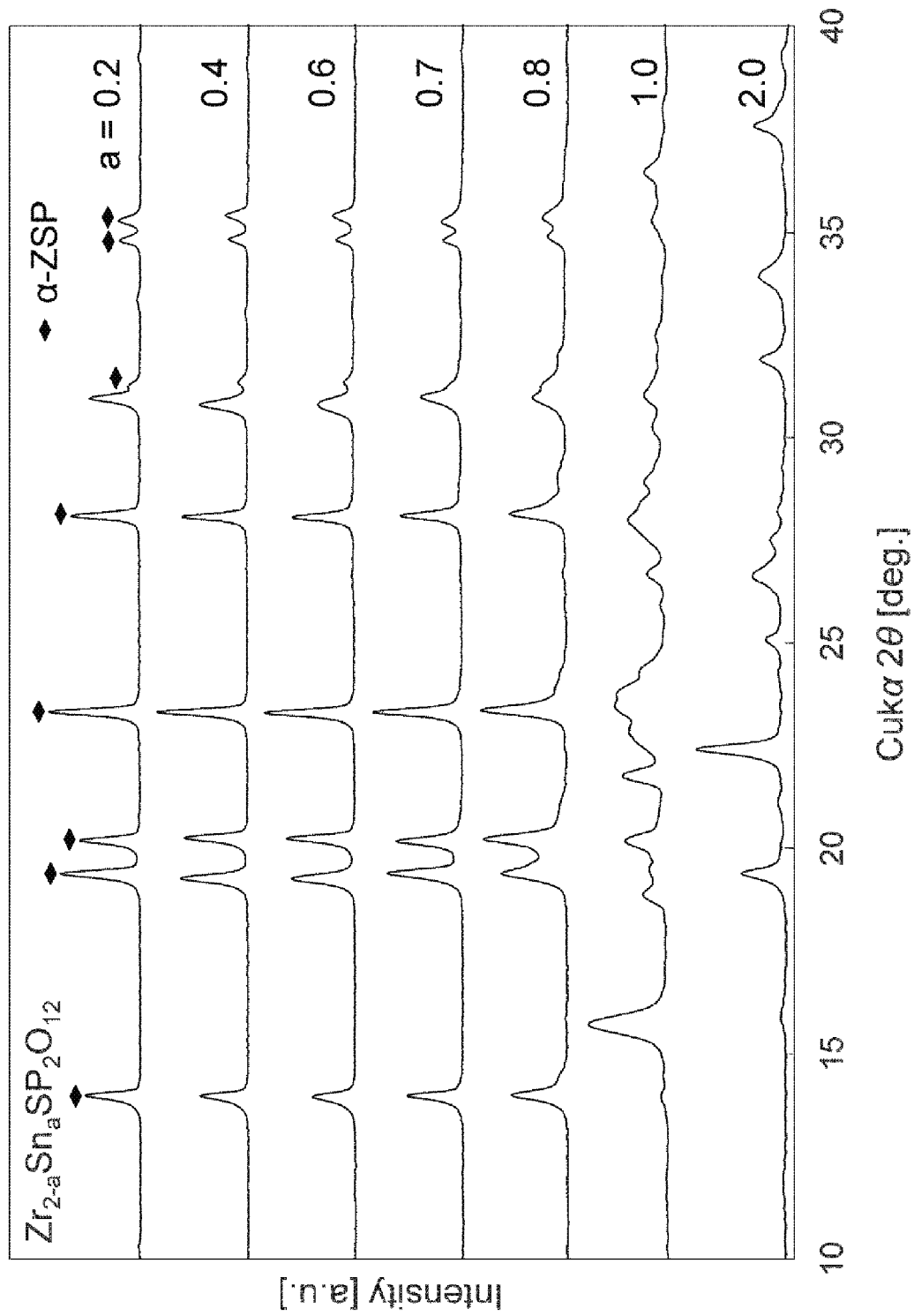
FIG. 24 is a graph showing the XRD measurement results of samples obtained by substituting part of Zr site with Sn.

For determining the crystal structures of the samples thus prepared, X ray diffraction measurement was carried out. FIG. 24 shows the XRD measurement results of a material ($Zr_{2-a}Sn_aS_xP_2O_{12+\delta}$) obtained by substituting part of Zr site with Sn. Note that, the apparatus and conditions used for XRD measurement the same as those mentioned above.

In the XRD measurement results shown in FIG. 24, crystal phase of $\alpha\text{-}Zr_2SP_2O_{12}$ ($\alpha$-ZSP) was confirmed in samples where a=0.2 to 0.8 (Sn 0.2 to 0.8). In contrast, in samples where the content of Sn is a=1.0 or more, an impurity phase was confirmed. Accordingly, in the samples where a is $0 < a \leq 0.8$, it is considered that part of Zr site was successfully substituted by Sn.

Figure 25:
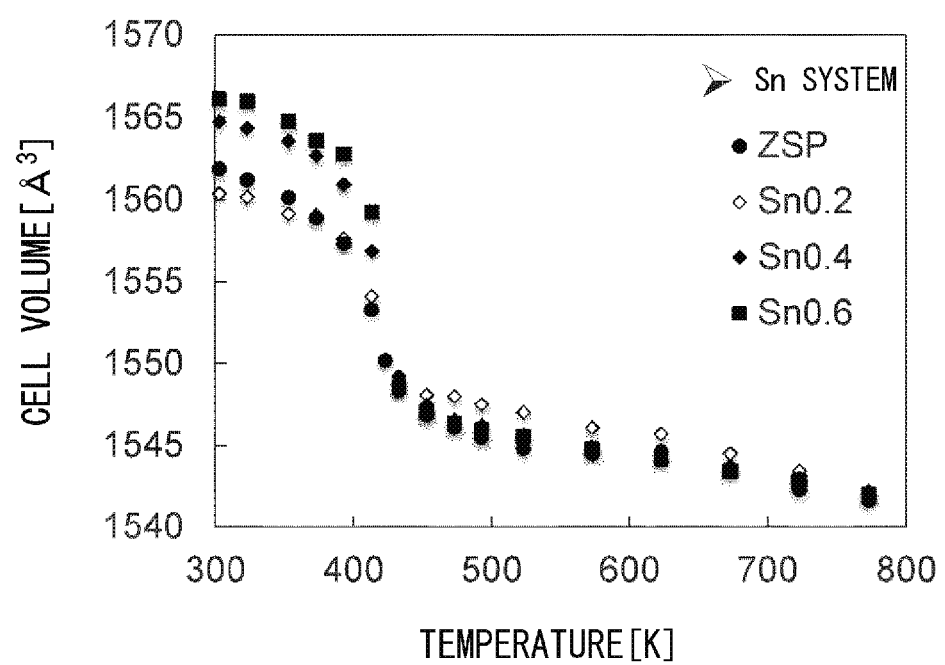
FIG. 25 is a graph showing the temperature characteristics of $Zr_{2-a}Sn_aSP_2O_{12}$.

The cell volume (thermal expansion coefficient) of the sample obtained by substituting part of Zr site with Sn was obtained by a high-temperature XRD apparatus. FIG. 25 is a graph showing temperature characteristics (temperature dependency of cell volume) of $Zr_{2-a}Sn_aSP_2O_{12}$ prepared. Note that, the apparatus and conditions used for high temperature XRD measurement are the same as those mentioned above.

As shown in FIG. 25, in samples of $Zr_{2-a}Sn_aSP_2O_{12}$ (a=0.4, a=0.6), the cell volume was large compared to that of $Zr_2SP_2O_{12}$ (ZSP) at 300 to 400 (K). With respect to the temperature dependency of cell volume, the same behavior as in $Zr_2SP_2O_{12}$ (ZSP) was shown. In $Zr_{2-a}Sn_aSP_2O_{12}$ (a=0.2), the cell volume of the sample was almost equal to that of $Zr_2SP_2O_{12}$ (ZSP). More specifically, it was found that $Zr_{2-a}Sn_aSP_2O_{12}$ (a=0.2 to 0.6) exhibited three-step thermal expansion behavior similarly to $Zr_2SP_2O_{12}$ (ZSP). Accordingly, it is considered that every time the slope of cell volume changes, a negative thermal expansion coefficient due to framework-phase transition-framework is shown.

FIG. 26 is a graph collectively showing thermal expansion coefficients of samples obtained by substituting part of Zr site with Ce, Mn and Sn in different temperature ranges. As shown in FIG. 2, also in the samples obtained by substituting part of Zr site with Ce, Mn and Sn, it is found that a negative thermal expansion coefficient is exhibited. Also, the thermal expansion coefficient of each sample varies in different temperature ranges. Accordingly, materials having different thermal expansion coefficients can be formed by substituting part of Zr site with these elements. Accordingly, the element for substitution can be appropriately selected depending on, e.g., the intended use.

(6) $Zr_2S_{1-b}Mo_bP_2O_{12+\delta}$

A material ($Zr_2S_{1-b}Mo_bP_2O_{12+\delta}$) obtained by substituting part of S site with Mo, will be described herein. A negative thermal expansion material represented by $Zr_2S_{1-b}Mo_bP_2O_{12+\delta}$ was produced by two processes, i.e., process A shown in the flowchart of FIG. 14 and a process B shown in the flowchart of FIG. 27.

Process A

First, process A will be described. As shown in FIG. 14, raw materials, $ZrCl_2O \cdot 8H_2O$ (Wako special grade, Wako Pure Chemical Industries Ltd.), $(NH_4)_6Mo_7O_{24} \cdot 4H_2O$ aq. (Wako special grade, Wako Pure Chemical Industries Ltd.), $(NH_4)_2HPO_4$ (reagent special grade, Kanto Chemical Co., Inc.) and $H_2SO_4$ (reagent special grade, Wako Pure Chemical Industries Ltd.) were prepared. Then, $ZrCl_2O \cdot 8H_2O$ and $(NH_4)_2HPO_4$ were each dissolved in distilled water so as to be 0.8 M. Subsequently, each (10 ml) of these aqueous solutions, $(NH_4)_6Mo_7O_{24} \cdot 4H_2O$ aq. (the amount corresponding to the ratio represented by "b") and 3 ml of $H_2SO_4$ were mixed. The mixture was stirred for 90 minutes by a stirrer (step S1). The $(NH_4)_6Mo_7O_{24} \cdot 4H_2O$ aq. used herein corresponds to a substance derived from a substitution element shown in FIG. 14. The following steps of the method are the same as in those of other methods for producing a negative thermal expansion material described above. Note that, in the baking step (step S5) shown in FIG. 14, two samples, i.e., a sample baked at 500° C. for 4 hours and a sample baked at 800° C. for 4 hours were prepared.

Process B

Process B will be described. Note that, in the flowchart shown in FIG. 27, steps S1 to S5 are the fundamentally the same as those of the flowchart shown in FIG. 14.

Figure 27:
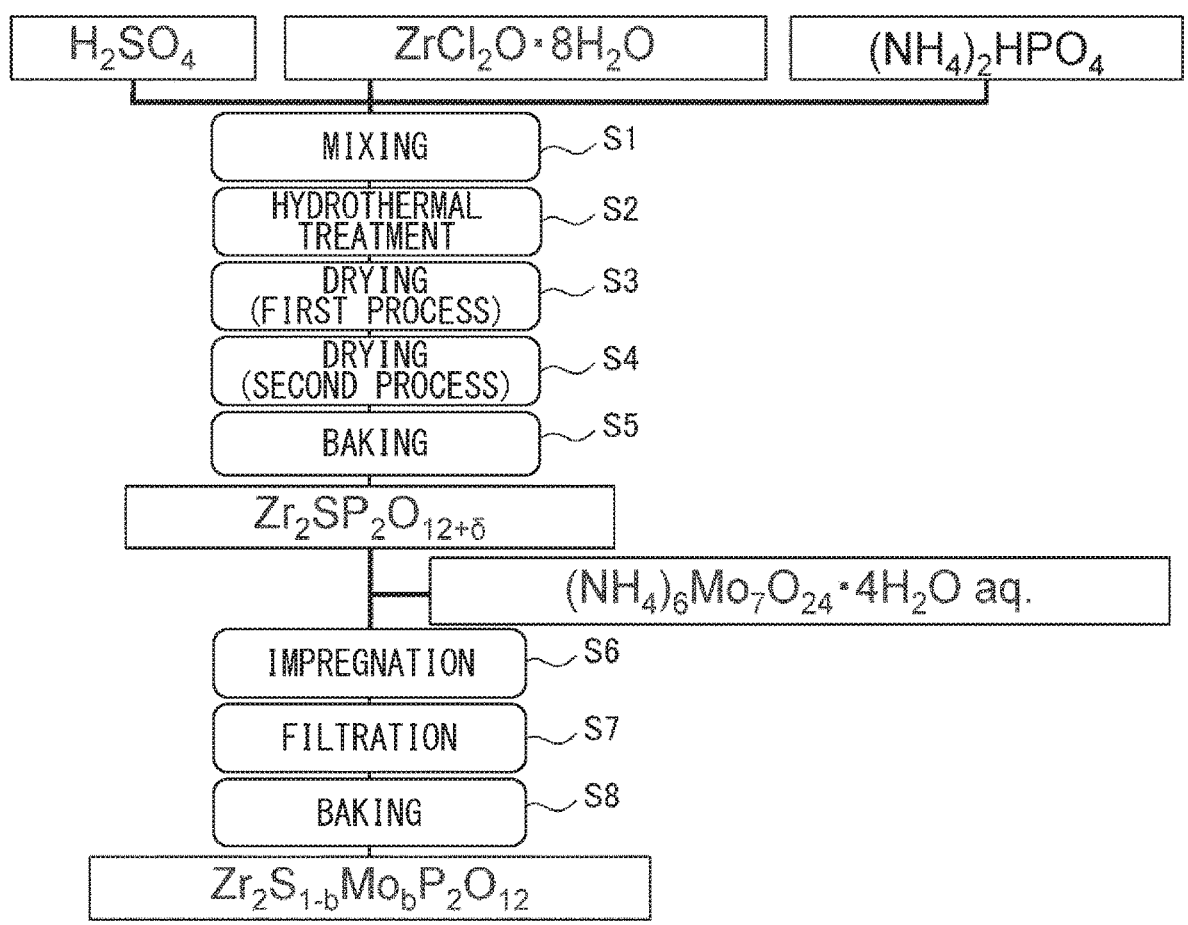
FIG. 27 shows the flowchart of a method for producing a negative thermal expansion material.

As shown in FIG. 27, first, raw materials, $ZrCl_2O \cdot 8H_2O$ (Wako special grade, Wako Pure Chemical Industries Ltd.), $(NH_4)_2HPO_4$ (reagent special grade, Kanto Chemical Co., Inc.) and $H_2SO_4$ (reagent special grade, Wako Pure Chemical Industries Ltd.) were prepared. Then, $ZrCl_2O \cdot 8H_2O$ and $(NH_4)_2HPO_4$ were each dissolved in distilled water so as to be 0.8 M. Subsequently, each (10 ml) of these aqueous solutions, and 3 ml of $H_2SO_4$ were mixed. The mixture was stirred for 90 minutes by a stirrer (step S1). The following steps S2 to S5 are the same as in the production method shown in FIG. 14. Note that, in the baking step (step S5), two samples, i.e., a sample baked at 600° C. for 4 hours and a sample baked at 800° C. for 4 hours were prepared.

Thereafter, $(NH_4)_6Mo_7O_{24} \cdot 4H_2O$ aq. (Wako special grade, Wako Pure Chemical Industries Ltd.) was impregnated with the $Zr_2SP_2O_{12+\delta}$ powder prepared in step S5 (step S6). Then, the solution containing $Zr_2SP_2O_{12+\delta}$ powder and $(NH_4)_6Mo_7O_{24} \cdot 4H_2O$ aq. was filtered (step S7). Thereafter, the filtrate (powder) was baked at 500° C. for 4 hours to prepare a sample (step S8).

Figure 28:
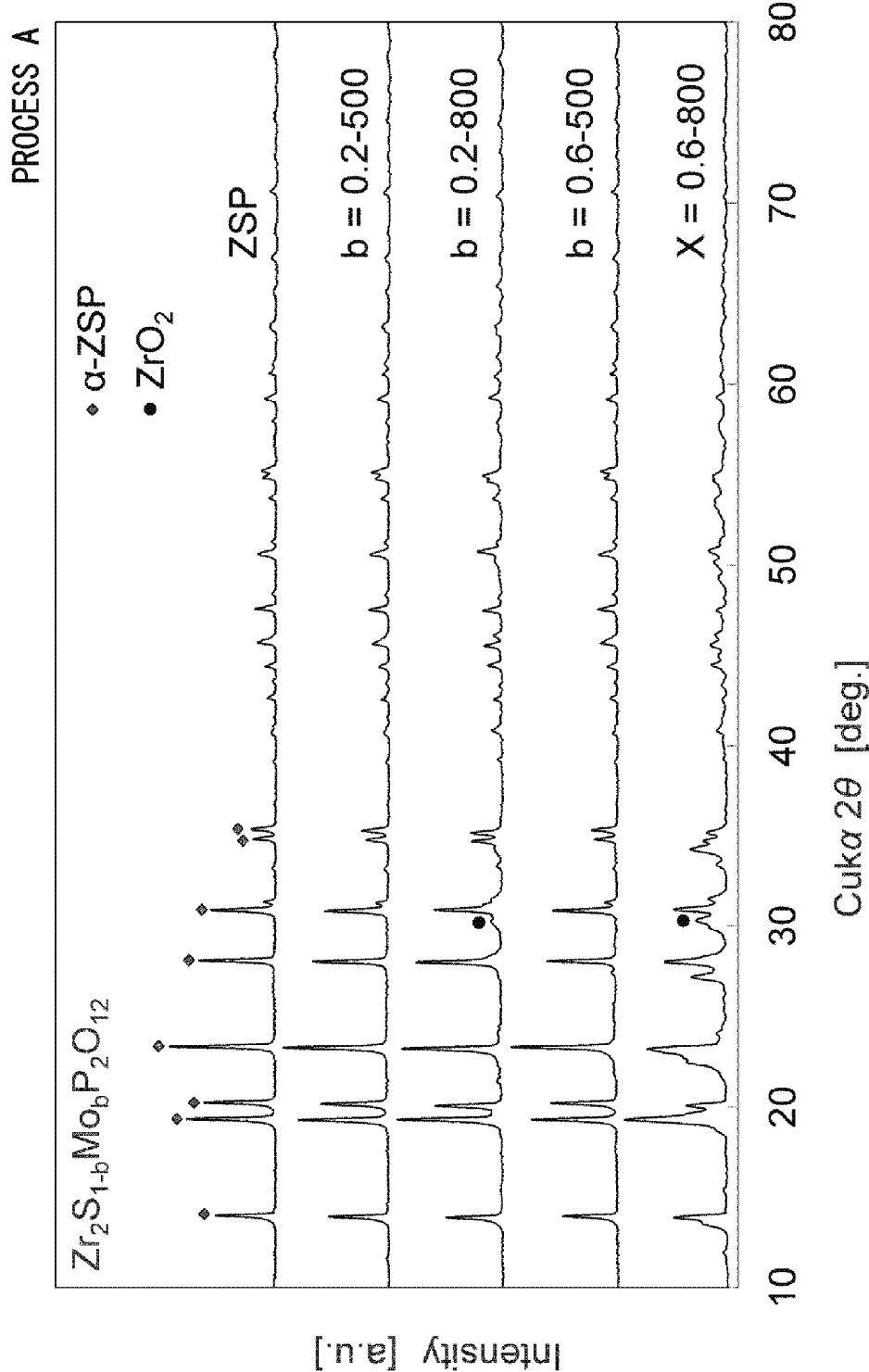
FIG. 28 is a graph showing the XRD measurement results of samples obtained by substituting part of S site with Mo.

For determining the crystal structures of the samples thus prepared, X ray diffraction measurement was carried out. FIG. 28 shows the XRD measurement results of the material represented by $Zr_2S_{1-b}Mo_bP_2O_{12+\delta}$ prepared in accordance with process A. Note that, the apparatus and conditions used for XRD measurement the same as those mentioned above.

FIG. 28 shows the XRD measurement results of a sample (the content of Mo: b=0.2, baking temperature of step S5: 500° C. (b=0.2-500)); a sample (the content of Mo: b=0.2, baking temperature of step S5: 800° C. (b=0.2-800)); a sample (the content of Mo: b=0.6, baking temperature of step S5: 500° C. (b=0.6-500)), and a sample (the content of Mo: b=0.6, baking temperature of step S5: 800° C. (b=0.6-800)).

In XRD measurement results shown in FIG. 28, $\alpha\text{-}Zr_2SP_2O_{12}$ ($\alpha$-ZSP) crystal phase was confirmed in the sample (b=0.2-500) where the content of Mo: b=0.2 and baking temperature of step S5: 500° C. and the sample (b=0.6-500) where the content of Mo: b=0.6 and baking temperature of step S5: 500° C. Accordingly, in these conditions, it is considered that part of S site was successfully substituted by Mo.

In contrast, in the sample (b=0.2-800) where the content of Mo: b=0.2 and baking temperature of step S5: 800° C. and the sample (b=0.6-800) where the content of Mo: b=0.6 and baking temperature of step S5: 800° C., a $ZrO_2$ peak was confirmed other than peaks of α-ZSP crystal phase. Accordingly, if the baking temperature of step S5 is high (800° C.), it was confirmed that $ZrO_2$ emerges.

Figure 29:
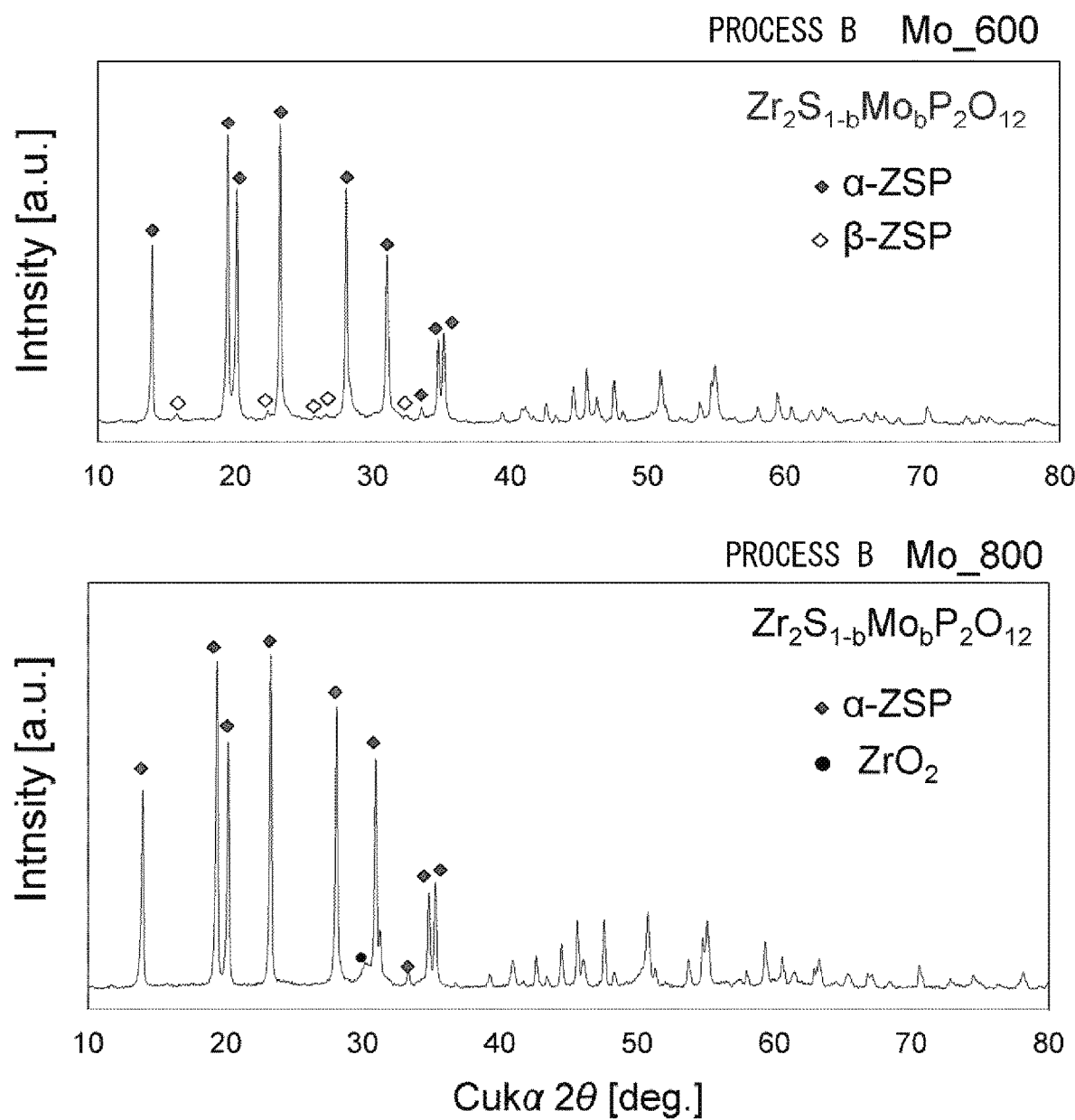
FIG. 29 is a graph showing the XRD measurement results of samples obtained by substituting part of S site with Mo.

FIG. 29 shows the XRD measurement results of a material ($Zr_2S_{1-b}Mo_bP_2O_{12+\delta}$) prepared in accordance with process B. FIG. 29 shows the XRD measurement results (upper graph) of a sample (baking temperature of step S5: 600° C., the content of Mo: b=0.02) and XRD measurement results (lower graph) of a sample (baking temperature of step S5: 800° C., the content of Mo: b=0.02). Note that, the apparatus and conditions used for high temperature XRD measurement are the same as those mentioned above.

In XRD measurement results shown in the upper graph of FIG. 29 (Mo_600), a few peaks of β-ZSP crystal phase were confirmed other than peaks of α-ZSP crystal phase. In XRD measurement results shown in the lower graph of FIG. 29 Mo_800), a few $ZrO_2$ peaks were confirmed other than peaks of α-ZSP crystal phase. β-ZSP and $ZrO_2$ peaks emerged; however these peaks are less intensive. Since peaks of α-ZSP crystal phase preferentially emerged, it is considered that part of S site was successfully substituted by Mo in the conditions.

Figure 30:
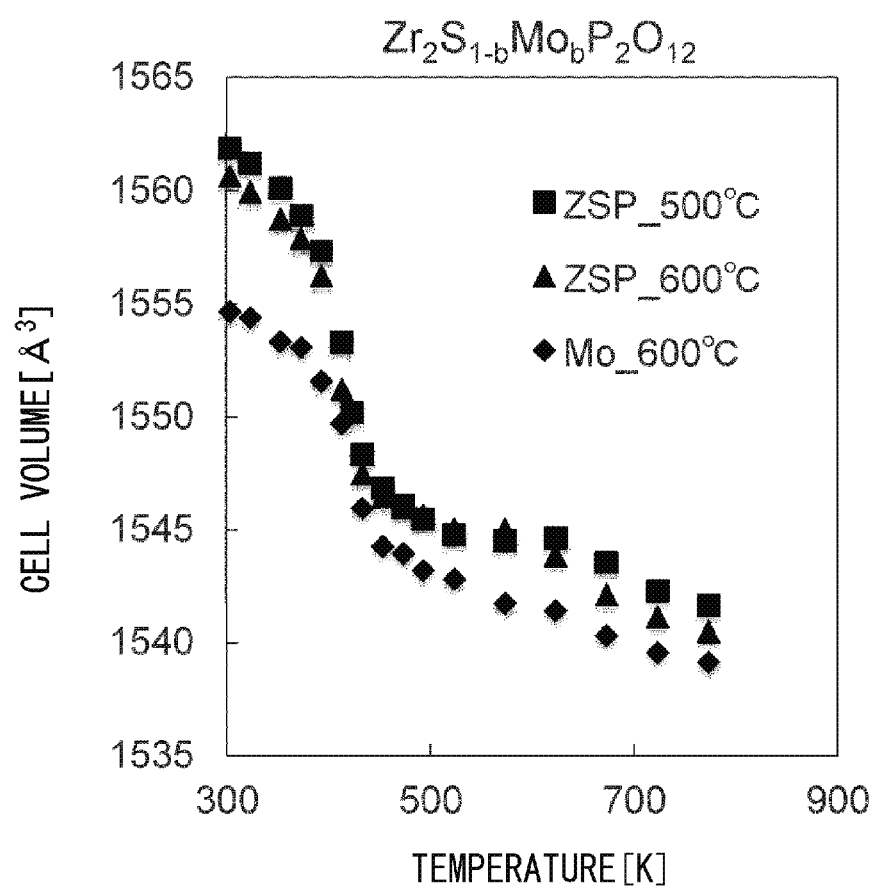
FIG. 30 is a graph showing the temperature characteristics of $Zr_2S_{1-b}Mo_bP_2O_{12}$.
Figure 31:
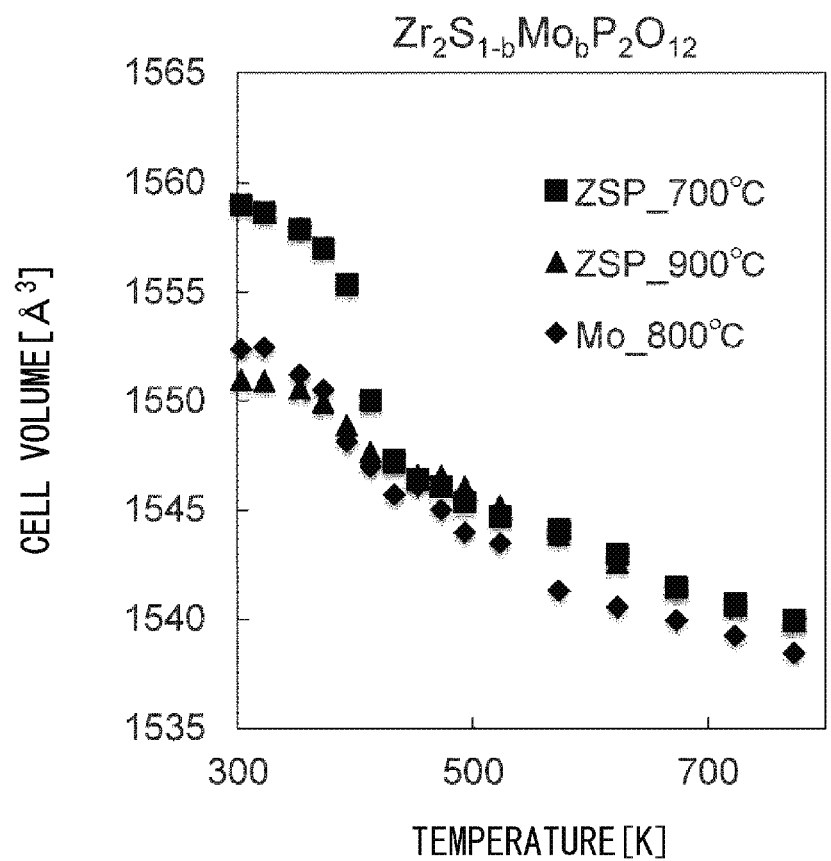
FIG. 31 is a graph showing the temperature characteristics of $Zr_2S_{1-b}Mo_bP_2O_{12}$.

The cell volume (thermal expansion coefficient) of a sample obtained by substituting part of S site with Mo was obtained by use of a high temperature XRD apparatus. FIG. 30 and FIG. 31 are graphs showing the temperature characteristics (temperature dependency of cell volume) of $Zr_2S_{1-b}Mo_bP_2O_{12}$ prepared. Note that, the apparatus and conditions used for high temperature XRD measurement are the same as those mentioned above.

FIG. 30 shows the temperature characteristics of $Zr_2SP_2O_{12}$ (ZSP) (ZSP_500° C.) obtained by baking at a temperature of 500° C., and ZSP (ZSP_600° C.) obtained by baking at 600° C. in step S5 of FIG. 14; and $Zr_2S_{1-b}Mo_bP_2O_{12}$ (Mo_600° C.) obtained by baking at a temperature of 600° C. in step S5 of FIG. 27. FIG. 31 shows the temperature characteristics of ZSP (ZSP_700° C.) obtained by baking at a temperature of 700° C., and ZSP (ZSP_900° C.) obtained by baking at 900° C. in step S5 of FIG. 14; and $Zr_2S_{1-b}Mo_bP_2O_{12}$ (Mo_800° C.) obtained by baking at a temperature of 800° C. in step S5 of FIG. 27

As shown in FIG. 30, in $Zr_2S_{1-b}Mo_bP_2O_{12}$ (Mo_600° C.) obtained by baking at a temperature of 600° C., the cell volume of the sample at 300 to 400 (K) was small compared to that of ZSP. With respect to the temperature dependency of cell volume, the same behavior as in ZSP was shown. As shown in FIG. 31, in $Zr_2S_{1-b}Mo_bP_2O_{12}$ (Mo_800° C.) obtained by baking at a temperature of 800° C., the cell volume of the sample at 300 to 400 (K) was small compared to that of ZSP_700° C. As shown in FIG. 31, in $Zr_2S_{1-b}Mo_bP_2O_{12}$ (Mo_800° C.) obtained by baking at a temperature of 800° C., the same temperature dependency as in ZSP_900° C. was shown at 300 to 800 (K). Accordingly, it was confirmed that $Zr_2S_{1-b}Mo_bP_2O_{12}$ obtained by substituting part of S site by Mo exhibits a negative thermal expansion coefficient.

(7) $Zr_2S_{1-b}W_bP_2O_{12+\delta}$

A material ($Zr_2S_{1-b}W_bP_2O_{12+\delta}$), obtained by substituting part of S site by W, will be described herein. A negative thermal expansion material represented by $Zr_2S_{1-b}W_bP_2O_{12+\delta}$ was produced by two processes, i.e., process A shown in the flowchart of FIG. 14 and process B shown in the flowchart of FIG. 27.

Process A

First, process A will be described. As shown in FIG. 14, raw materials, $ZrCl_2O \cdot 8H_2O$ (Wako special grade, Wako Pure Chemical Industries Ltd.), $(NH_4)_{10}W_{12}O_{41} \cdot 5H_2O$ (Wako Pure Chemical Industries Ltd.), $(NH_4)_2HPO_4$ (reagent special grade, Kanto Chemical Co., Inc.) and $H_2SO_4$ (reagent special grade, Wako Pure Chemical Industries Ltd.) were prepared. Then, $ZrCl_2O \cdot 8H_2O$ and $(NH_4)_2HPO_4$ were each dissolved in distilled water so as to be 0.8 M. Subsequently, each (10 ml) of these aqueous solutions, $(NH_4)_{10}W_{12}O_{41} \cdot 5H_2O$ (the amount corresponding to the ratio represented by "b") and 3 ml of $H_2SO_4$ were mixed. The mixture was stirred for 90 minutes by a stirrer (step S1). The $(NH_4)_{10}W_{12}O_{41} \cdot 5H_2O$ used herein corresponds to a substance derived from a substitution element shown in FIG. 14. The following steps of the method are the same as in those of other methods for producing a negative thermal expansion material described above. Note that, in the baking step (step S5), two samples, i.e., a sample baked at 500° C. for 4 hours and a sample baked at 800° C. for 4 hours were prepared.

Process B

Process B will be described. Note that, in the flowchart shown in FIG. 27, steps S1 to S5 are the fundamentally the same as those of the flowchart shown in FIG. 14.

As shown in FIG. 27, first, raw materials, $ZrCl_2O \cdot 8H_2O$ (Wako special grade, Wako Pure Chemical Industries Ltd.), $(NH_4)_2HPO_4$ (reagent special grade, Kanto Chemical Co., Inc.) and $H_2SO_4$ (reagent special grade, Wako Pure Chemical Industries Ltd.) were prepared. Then, $ZrCl_2O \cdot 8H_2O$ and $(NH_4)_2HPO_4$ were each dissolved in distilled water so as to be 0.8 M. Subsequently, each (10 ml) of these aqueous solutions, and 3 ml of $H_2SO_4$ were mixed. The mixture was stirred for 90 minutes by a stirrer (step S1). The following steps S2 to S5 are the same as in the production method shown in FIG. 14. Note that, in the baking step (step S5), two samples, i.e., a sample baked at 600° C. for 4 hours and a sample baked at 800° C. for 4 hours were prepared.

Thereafter, $(NH_4)_{10}W_{12}O_{41} \cdot 5H_2O$ aq. (Wako special grade, Wako Pure Chemical Industries Ltd.) was impregnated with the $Zr_2SP_2O_{12+\delta}$ powder prepared in step S5 (step S6). Then, the solution containing $Zr_2SP_2O_{12+\delta}$ powder and $(NH_4)_{10}W_{12}O_{41} \cdot 5H_2O$ was filtered (step S7). Thereafter, the filtrate (powder was baked at 500° C. for 4 hours to prepare a sample (step S8)

Figure 32:
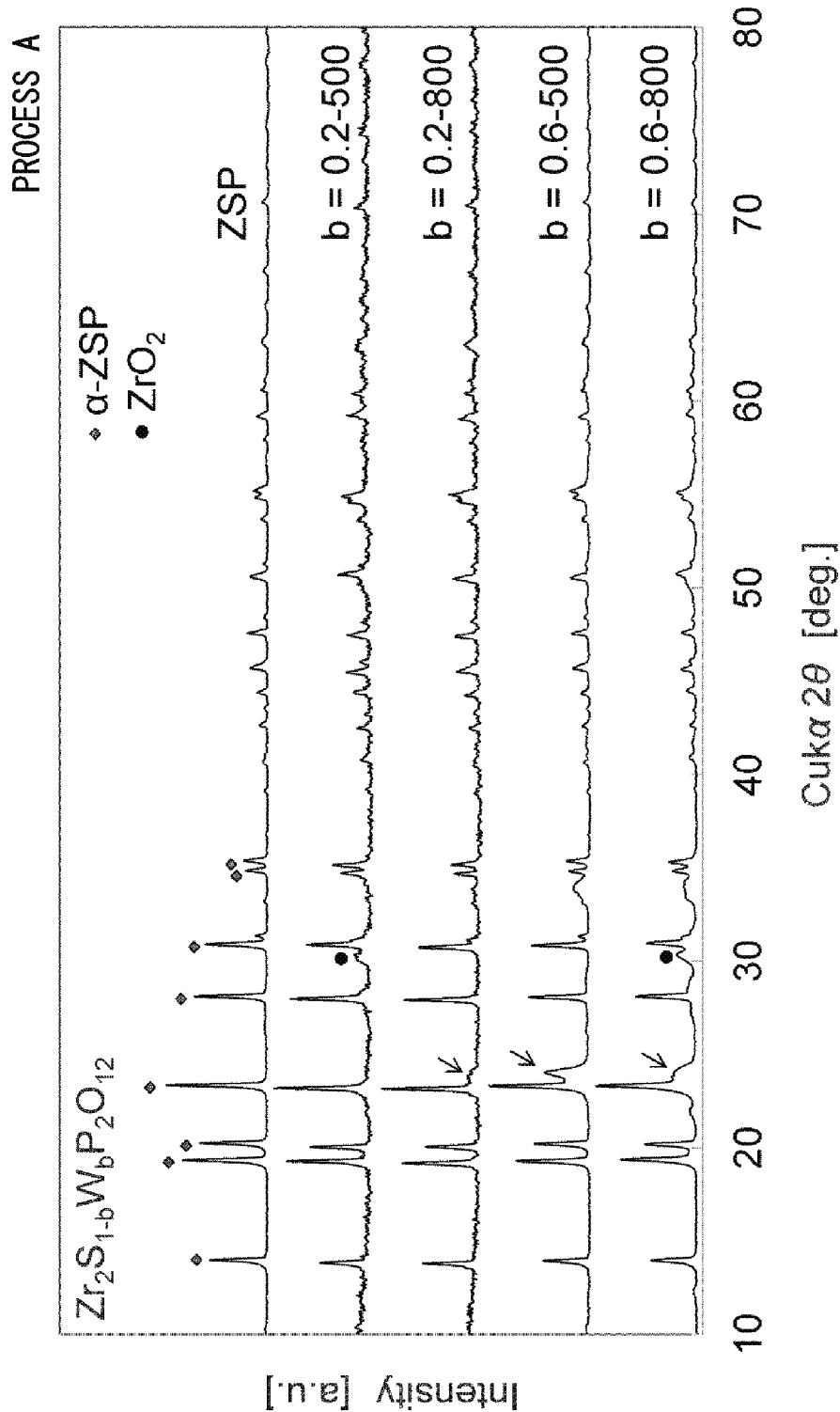
FIG. 32 is a graph showing the XRD measurement results of samples obtained by substituting part of S site with W.

For determining the crystal structures of the samples thus prepared, X ray diffraction measurement was carried out. FIG. 32 shows the XRD measurement results of a material ($Zr_2S_{1-b}W_bP_2O_{12+\delta}$) prepared in accordance with process A. Note that, the apparatus and conditions used for XRD measurement the same as those mentioned above.

FIG. 32 shows the XRD measurement results of a sample (the content of W: b=0.2, baking temperature of step S5: 500° C. (b=0.2-500)); a sample (the content of W: b=0.2, baking temperature of step S5: 800° C. (b=0.2-800)); a sample (the content of W: b=0.6, baking temperature of step S5: 500° C. (b=0.6-500)), and a sample (the content of W: b=0.6, baking temperature of step S5: 800° C. (b=0.6-800)).

In XRD measurement results shown in FIG. 32, α-ZSP crystal phase was confirmed in the sample (b=0.2-500) where the content of W: b=0.2 and baking temperature of step S5: 500° C. Accordingly, in these conditions, it is considered that part of S site was successfully substituted by W.

In contrast, in the sample (b=0.2-800) where the content of W: b=0.2 and baking temperature of step S5: 800° C., the sample (b=0.6-800) where the content of W: b=0.6 and baking temperature of step S5: 500° C. and the sample (b=0.6-800) where the content of W: b=0.6 and baking temperature of step S5: 800° C., peaks of impurity phases (indicated by arrows) were confirmed other than peaks of α-ZSP crystal phase.

Figure 33:
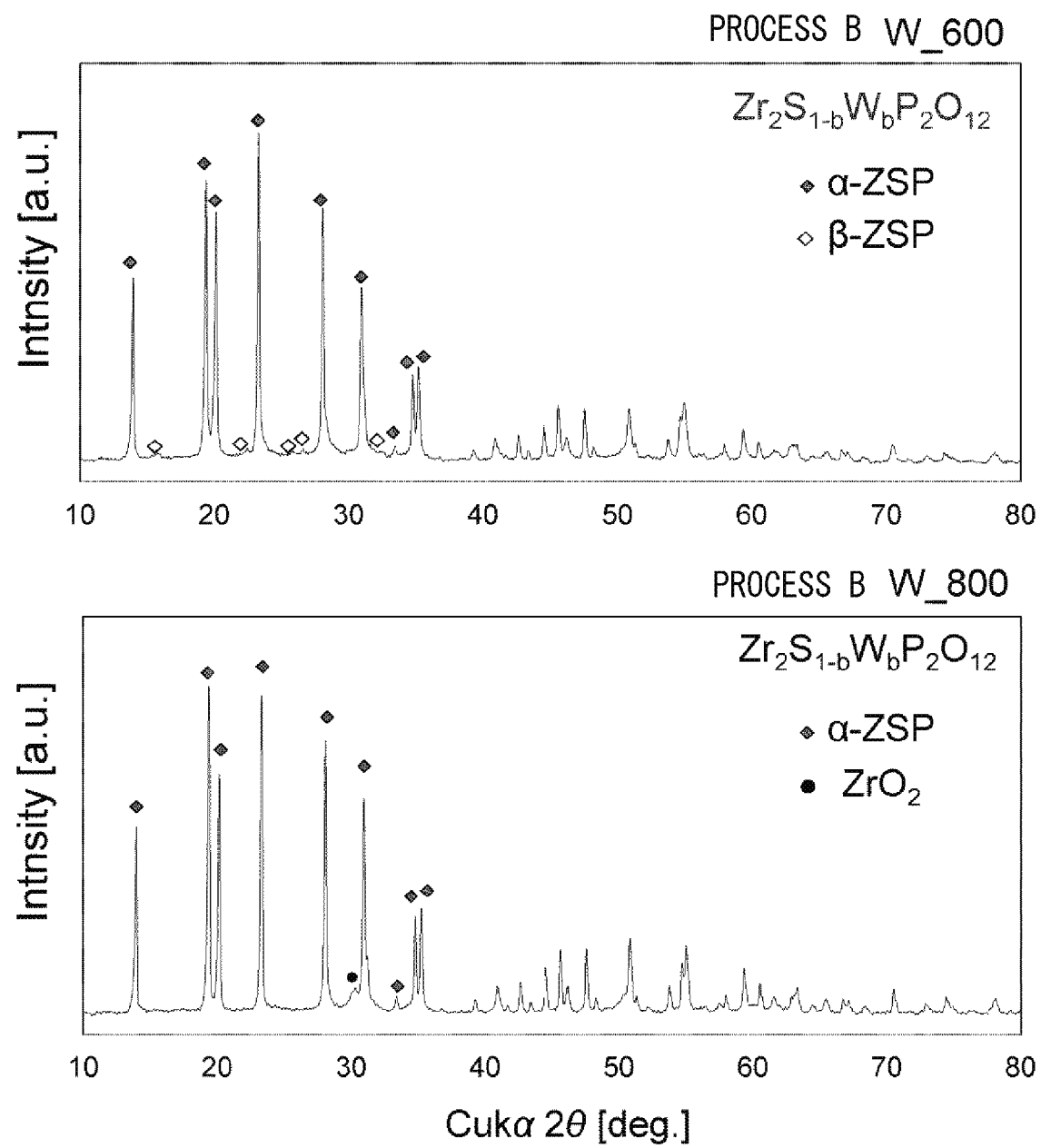
FIG. 33 is a graph showing the XRD measurement results of samples obtained by substituting part of S site with W.

FIG. 33 shows the XRD measurement results of a material ($Zr_2S_{1-b}W_bP_2O_{12+\delta}$) prepared in accordance with process B. FIG. 33 shows XRD measurement results (upper graph) of the sample (baking temperature of step S5: 600° C., the content of W: b=0.06) and the XRD measurement results (lower graph) of the sample (baking temperature of step S5: 800° C., the content of W: b=0.06). Note that, the apparatus and conditions used for high temperature XRD measurement are the same as those mentioned above.

In XRD measurement results shown in the upper graph of FIG. 33 (W_600), a few peaks of β-ZSP crystal phase were confirmed other than peaks of α-ZSP crystal phase. In XRD measurement results shown in the lower graph of FIG. 33 (W_800), a few $ZrO_2$ peaks were confirmed other than peaks of α-ZSP crystal phase. β-ZSP and $ZrO_2$ peaks emerged; however these peaks are less intensive. Since peaks of α-ZSP crystal phase preferentially emerged, it is considered that part of S site was successfully substituted by W in the conditions.

Figure 34:
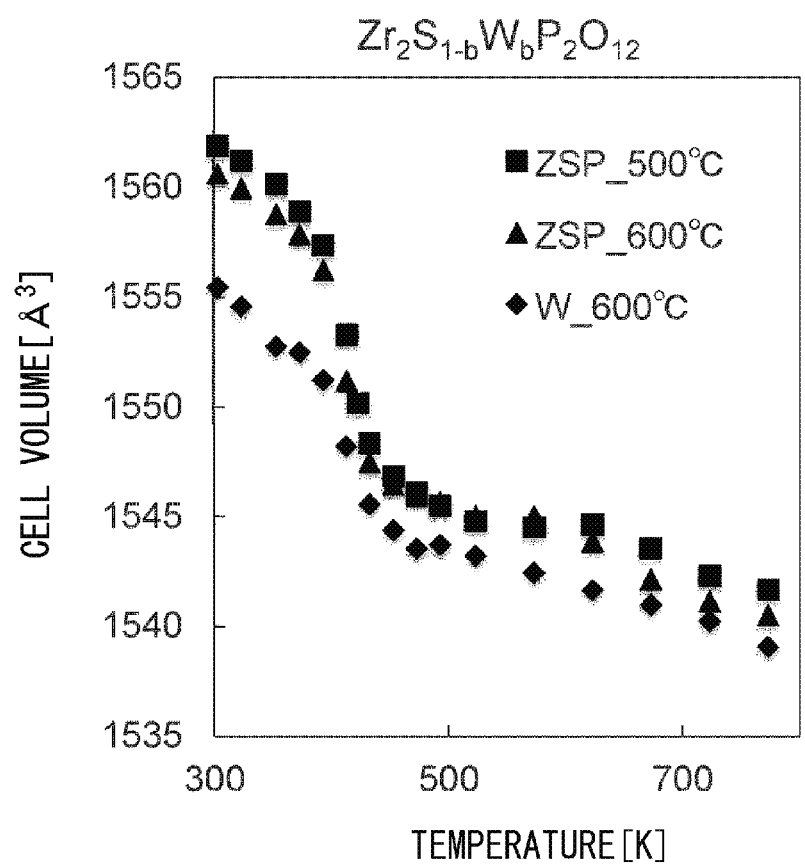
FIG. 34 is a graph showing temperature characteristics of $Zr_2S_{1-b}W_bP_2O_{12}$.
Figure 35:
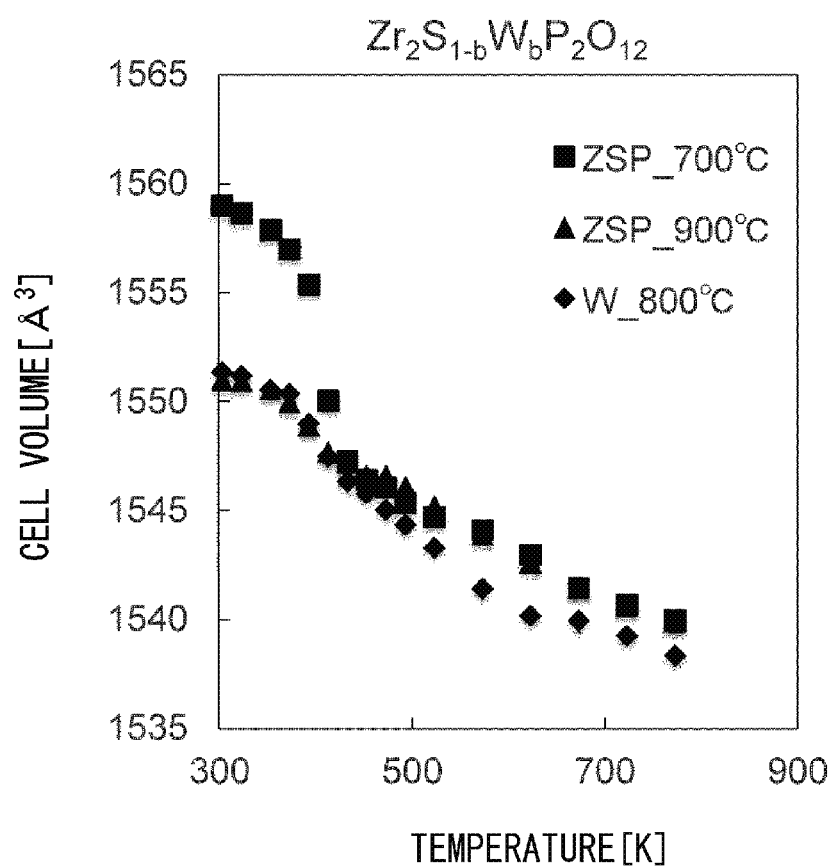
FIG. 35 is a graph showing temperature characteristics of $Zr_2S_{1-b}W_bP_2O_{12}$.

The cell volume (thermal expansion coefficient) of a sample obtained by substituting part of S site with W was obtained by use of a high temperature XRD apparatus. FIG. 34 and FIG. 35 are graphs showing the temperature characteristics (temperature dependency of cell volume) of $Zr_2S_{1-b}W_bP_2O_{12}$ prepared. Note that, the apparatus and conditions used for high temperature XRD measurement are the same as those mentioned above.

FIG. 34 shows the temperature characteristics of ZSP (ZSP_500° C.) obtained by baking at a temperature of 500° C. and ZSP (ZSP_600° C.) obtained by baking at 600° C. in step S5 of FIG. 14; and $Zr_2S_{1-b}W_bP_2O_{12}$ (W_600° C.) obtained by baking at a temperature of 600° C. in step S5 of FIG. 27. FIG. 35 shows the temperature characteristics of ZSP (ZSP_700° C.) obtained by baking at a temperature of 700° C. and ZSP (ZSP_900° C.) obtained by baking at 900° C. in step S5 of FIG. 14; and $Zr_2S_{1-b}W_bP_2O_{12}$ (W_800° C.) obtained by baking at a temperature of 800° C. in step S5 of FIG. 27.

As shown in FIG. 34, in $Zr_2S_{1-b}W_bP_2O_{12}$ (W_600° C.) obtained by baking at a temperature of 600° C., the cell volume of the sample at 300 to 400 (K) was small compared to that of ZSP. With respect to the temperature dependency of the cell volume, the same behavior as in ZSP was shown. As shown in FIG. 35, in $Zr_2S_{1-b}W_bP_2O_{12}$ (W_800° C.) obtained by baking at a temperature of 800° C., the cell volume of the sample at 300 to 400 (K) was small compared to that of ZSP_700° C. As shown in FIG. 31, in $Zr_2S_{1-b}W_bP_2O_{12}$ (W_800° C.) obtained by baking at a temperature of 800° C., the same temperature dependency as in ZSP_900° C. was shown at 300 to 800 (K). Accordingly, it was confirmed that $Zr_2S_{1-b}W_bP_2O_{12}$ obtained by substituting part of S site with W exhibits a negative thermal expansion coefficient.

In the above, Examples of $Zr_{2-a}M_aS_xP_2O_{12+\delta}$ obtained by substituting part of Zr site and Examples obtained by substituting part of S site were separately described. However, in the present invention, both part of Zr site and S site may be substituted.

In the foregoing, the present invention has been described along with the embodiments. The present invention is not limited to the constitutions of the above embodiments and, needless to say, the present invention includes various modification, corrections and combinations which can be carried out by those skilled in the art within the range of claims of the present application.

The invention claimed is:

1. A negative thermal expansion material having a negative thermal expansion coefficient and represented by $Zr_{2-a}M_aS_xP_2O_{12+\delta}$, wherein M is Sn; a is 0<a≤1; x is 0.4≤x≤1; and δ is a value defined so as to satisfy a charge neutral condition.

2. The negative thermal expansion material according to claim 1, wherein x is 0.4≤x≤0.48.

3. A composite material comprising the negative thermal expansion material according to claim 2 and a metal material having a positive thermal expansion coefficient.

4. A composite material comprising the negative thermal expansion material according to claim 1 and a material having a positive thermal expansion coefficient.

5. A negative thermal expansion material having a negative thermal expansion coefficient and represented by $Zr_{2-a}M_aS_xP_2O_{12+\delta}$ where M is at least one selected from Ti, Ce, Sn, Mn, Hf, Ir, Pb, Pd and Cr; a is 0≤a<2; x is 0.4≤x≤1; and δ is a value defined so as to satisfy a charge neutral condition, wherein part of S site is substituted by Mo or W.

6. A negative thermal expansion material comprising:
a composite material represented by $Zr_{2-a}M_aS_xP_2O_{12+\delta}$ where M is at least one selected from Ti, Ce, Sn, and Mn; a is 0≤a≤2; x is 0.48≤x≤0.9 and δ is a value defined so as to satisfy a charge neutral condition,
wherein the composite material has a negative thermal expansion coefficient.

7. The negative thermal expansion material according to claim 6, wherein an absolute value of volume expansion coefficient of the negative thermal expansion material at a temperature of 100 to 180° C. is larger than an absolute value of volume expansion coefficient of the negative thermal expansion material at a temperature of larger than 180° C.

8. A composite material comprising the negative thermal expansion material according to claim 6 and a resin material having a positive thermal expansion coefficient.

9. A method for producing the negative thermal expansion material of claim 8, comprising:
a step of hydrothermally treating a mixture containing zirconium oxychloride octahydrate, ammonium phosphate, sulfuric acid and an additive containing element M at a temperature of 130° C. or more, and
a step of baking the mixture hydrothermally treated, at a temperature of 450° C. or more to form the negative thermal expansion material.

10. The method for producing the negative thermal expansion material according to claim 9, wherein the value of x is controlled by controlling a temperature for baking the mixture hydrothermally treated.

11. The method for producing the negative thermal expansion material according to claim 9, wherein the temperature for the hydrothermal treatment is 180° C. or more.

12. The method for producing the negative thermal expansion material according to claim 9, wherein the temperature for baking the mixture hydrothermally treated is 450° C. or more to 900° C. or less.

* * * * *